(12) United States Patent
Cusine Barber

(10) Patent No.: US 12,364,204 B2
(45) Date of Patent: Jul. 22, 2025

(54) BALE BUNDLING SYSTEM, BALE BUNDLING MACHINE AND PROCEDURE FOR FORMING BUNDLES OF BALES OF HAY OR SIMILAR MATERIAL

(71) Applicant: ARCUSIN S.A., Vila-Sana (ES)

(72) Inventor: Manuel Cusine Barber, Vila-Sana (ES)

(73) Assignee: ARCUSIN S.A., Vila-Sana (ES)

( * ) Notice: Subject to any disclaimer, the term of this patent is extended or adjusted under 35 U.S.C. 154(b) by 0 days.

(21) Appl. No.: 18/993,375

(22) PCT Filed: Apr. 29, 2024

(86) PCT No.: PCT/EP2024/061812
§ 371 (c)(1),
(2) Date: Jan. 10, 2025

(87) PCT Pub. No.: WO2024/223951
PCT Pub. Date: Oct. 31, 2024

(65) Prior Publication Data
US 2025/0160256 A1    May 22, 2025

(30) Foreign Application Priority Data

Apr. 27, 2023    (EP) ..................................... 23382392

(51) Int. Cl.
*A01D 85/00*    (2006.01)
(52) U.S. Cl.
CPC ................................. *A01D 85/005* (2013.01)
(58) Field of Classification Search
CPC ................................................... A01D 85/005
See application file for complete search history.

(56) References Cited

U.S. PATENT DOCUMENTS

| | | | | |
|---|---|---|---|---|
| 3,278,049 A | * | 10/1966 | Hollyday | ............... A01D 90/08 |
| | | | | 414/789.2 |
| 3,278,050 A | * | 10/1966 | Tarbox | ................... A01D 90/08 |
| | | | | 414/789.7 |

(Continued)

FOREIGN PATENT DOCUMENTS

| CN | 112825679 A | * | 5/2021 | ........... A01D 85/001 |
|---|---|---|---|---|
| EP | 1222850 | | 7/2002 | |

(Continued)

OTHER PUBLICATIONS

International Search Report and Written Opinion issued in PCT/EP2024/061812, mailed Aug. 2, 2024. (10 pages).

*Primary Examiner* — Lucas E. A. Palmer
(74) *Attorney, Agent, or Firm* — ICE MILLER LLP; Safet Metjahic

(57) ABSTRACT

It comprises a bundling chamber (2) and a bale conveying device (5), wherein the bundling chamber (2) includes; a first enclosure (2a) to form a first bundle (B1) of bales inside the bundling chamber (2), and a second enclosure (2b) to form a second bundle (B2) of bales inside the bundling chamber (2), wherein said bale conveying device (5) is arranged to convey a first incoming bale (3B1) to a first bale loading position (P1) and a second incoming bale (3B2) to a second bale loading position (P2). The system further includes at least one bale pushing device (8a, 8b) to displace said first and second incoming bales (3B1, 3B2) from the first and second bale loading positions (P1, P2) into the respective first and second enclosures (2a, 2b), and processing and control means configured to successively send a control signal to said at least one bale pushing device (8a, 8b) for said bale pushing device (8a, 8b) to successively displace a number of new incoming bales (3B1, 3B2) into the respective first and second enclosures (2a, 2b).

24 Claims, 28 Drawing Sheets

(56) References Cited

U.S. PATENT DOCUMENTS

| | | | | |
|---|---|---|---|---|
| 3,490,613 A * | 1/1970 | Bellan | B60P 1/40 | 414/528 |
| 3,510,013 A * | 5/1970 | Best | A01D 90/08 | 414/789.7 |
| 3,563,162 A * | 2/1971 | Monroe | A01D 90/08 | 100/17 |
| 3,726,210 A * | 4/1973 | Hawkins | B65B 27/12 | 100/17 |
| 3,938,432 A * | 2/1976 | Jones | A01D 90/08 | 414/789.7 |
| 5,695,311 A * | 12/1997 | Miguel | A01D 90/08 | 414/789.7 |
| 5,697,758 A * | 12/1997 | Tilley | A01D 90/08 | 414/812 |
| 6,171,046 B1 * | 1/2001 | Nutcher | A01D 90/08 | 414/245 |
| 6,182,563 B1 * | 2/2001 | Brown, Jr. | A01D 85/002 | 100/29 |
| 6,364,591 B1 * | 4/2002 | Stevenson | A01D 90/08 | 414/789.7 |
| 7,080,494 B2 * | 7/2006 | Toews | A01F 15/005 | 53/529 |
| 7,322,173 B2 * | 1/2008 | Desnoyers | B65B 27/12 | 53/587 |
| 7,610,851 B1 * | 11/2009 | Horst | A01D 85/005 | 53/529 |
| 8,122,822 B1 * | 2/2012 | Horst | A01D 85/002 | 100/188 R |
| 12,041,882 B1 * | 7/2024 | Cusine Barber | A01D 90/10 | |
| 2006/0064942 A1 | 3/2006 | Toews | | |
| 2008/0095597 A1 * | 4/2008 | Heitz | A01D 85/005 | 414/335 |
| 2024/0349649 A1 * | 10/2024 | Bowden, Jr. | A01D 87/125 | |

FOREIGN PATENT DOCUMENTS

| | | | | |
|---|---|---|---|---|
| FR | 2751506 A1 * | 1/1998 | | A01D 85/005 |
| NL | 1 024 477 C1 | 4/2005 | | |

* cited by examiner

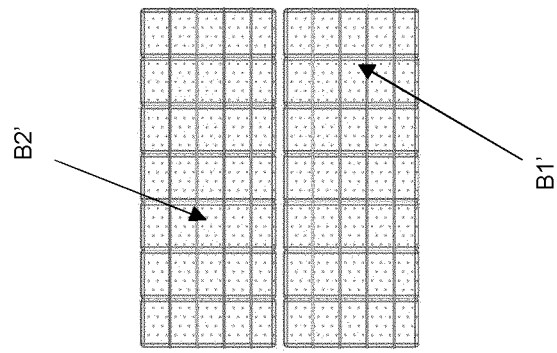
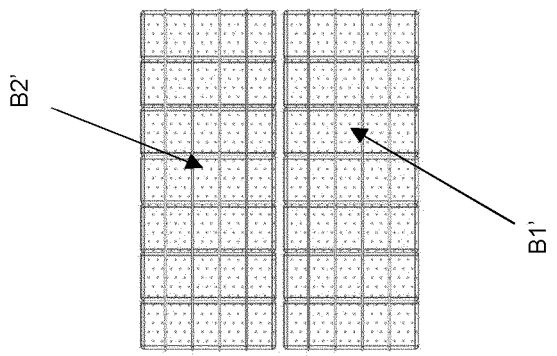
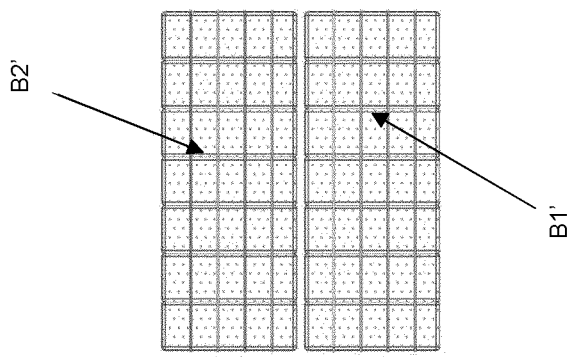
FIG. 25

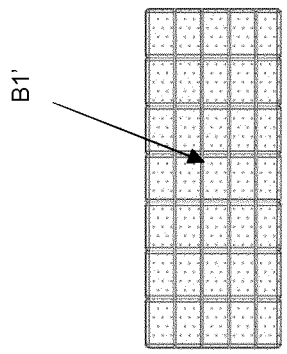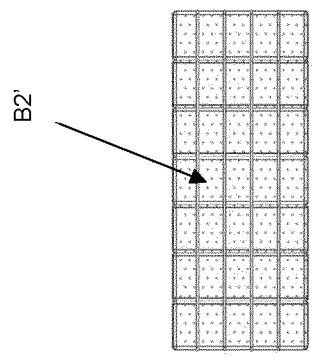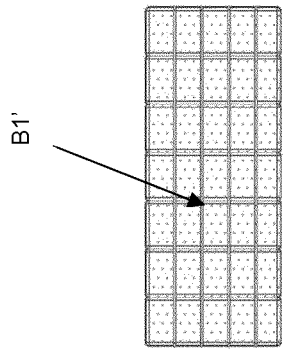
FIG. 27

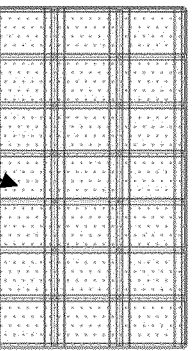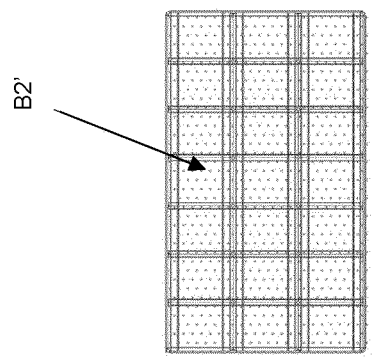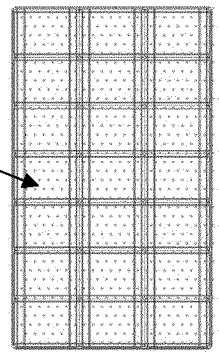
FIG. 28

BALE BUNDLING SYSTEM, BALE BUNDLING MACHINE AND PROCEDURE FOR FORMING BUNDLES OF BALES OF HAY OR SIMILAR MATERIAL

CROSS-REFERENCE TO RELATED PATENT APPLICATIONS

This is a U.S. National Phase Application under 35 U.S.C. § 371 of International Patent Application No. PCT/EP2024/061812, filed Apr. 29, 2024, and claims priority to European Patent Application No. 23382392.1, filed Apr. 27, 2023, which is incorporated by reference in its entirety. The International Application was published on Oct. 31, 2024, as International Publication No. 2024/223951 A1.

The present invention relates to a bale bundling system for forming a plurality of bale bundles, in particular, first and second bundles of bales of hay or similar material wherein each bundle comprises a plurality of layers of bales and said bales have a predetermined nominal width "A". It also relates to a bundling machine of the type to be towed by a tractor or similar vehicle comprising a bundling chamber suitable for forming said first and second bundles of bales. Finally, the present invention also relates to a method for forming a first bale bundle and a second bale bundle within the bundling chamber of the bundling machine.

BACKGROUND OF THE INVENTION

Bale bundling machines to be towed by a tractor for forming bale bundles of hay or similar material are known. These machines pick up individual bales from the ground and convey said bales at an entrance of a bale bundling chamber where the bales are successively introduced, grouped, and bound together to form a pack inside the bundling chamber which can be arranged horizontally or vertically on the frame of a machine.

Documents EP1222850A1 and U.S. Pat. No. 8,122,822B1 disclose bale bundling machines of the type mentioned above which have the main advantage that prevent farmers from handling individual bales by hand, permitting economical handling in connection with storage and transportation of bales. No less important, those bale bundling machines have the additional advantage that contribute to reduce soil compaction by reducing time needed for bale collection and avoiding multiple passes with heavy vehicles through the field.

Attempts have been made to form large bundles of hay without success. A large bale bundle would afford more economic advantages in handling and in transportation. However, large bundle of bales risk of becoming loose, making them difficult to handle and often resulting in hay loss and waste.

DESCRIPTION OF THE INVENTION

The aim of the present invention is to solve the aforementioned drawbacks by providing a bale bundling system and bale bundling machine with the advantages that will be described below.

In accordance with this objective, according to a first aspect, the present invention provides a bale bundling system for a bale bundling machine, comprising a bundling chamber and at least one bale conveying device to convey bales to a bale entrance of the bundling chamber, characterized in that the bundling chamber includes;

a first enclosure inside the bundling chamber configured and arranged to be able to form a first bundle of bales inside the bundling chamber, wherein said first bale bundle comprises a plurality of layers of bales, and a second enclosure inside the bundling chamber configured and arranged to be able to form a second bundle of bales inside the bundling chamber, wherein said second bundle of bales comprises a plurality of layers of bales, wherein, said at least one bale conveying device is arranged to convey a first incoming bale to a first bale loading position (P1) and a second incoming bale to a second bale loading position (P2).

The system further comprises;

at least one bale pushing device arranged to displace said first and second incoming bales from the first and second bale loading positions (P1, P2) into the respective first and second enclosures, processing and control means, for example a processing and control unit, configured to successively send a control signal to said at least one bale pushing device for said bale pushing device to successively displace a number of incoming bales from the respective bale loading positions (P1, P2) into the respective first and second enclosures to form one of said plurality of bale layers within the respective first and second enclosures, and at least one bale pressing device arranged to displace said bale layers formed within the first and second enclosures to clear respective volume portions within the first and second enclosures for said volume portions to be able to receive a number of new incoming bales to form new respective bale layers within the respective first and second enclosures, wherein said processing and control means are further configured to send a control signal to said at least bale pressing device for said bale pressing device to successively displace a number of formed bale layers within the respective first and second enclosures to be able to form said first and second bale bundles within the bundling chamber.

The present invention provides a bale bundling system permitting a plurality of bale bundles to be formed inside a bundling chamber, wherein said first and second enclosures inside the bundling chamber are configured and arranged to respectively form said first and second bales bundles disposed vertically, horizontally or tilted in a longitudinal direction "Y" of the bundles.

In particular, the present invention provides a bale bundling system wherein a first and a second bale bundles are formed inside a bundling chamber of a bale bundling machine, for example, a bale bundling machine of the type to be towed by a tractor or similar vehicle. Both first and second bale bundles can be unloaded from the same bundling chamber and exit the machine smoothly as it moves forward so that both first and second bale bundles may rest arranged in pairs on the ground of the field one next to the other ready for collection.

Thus, the claimed invention significantly reduces time needed for bale collection and what is more important, it significantly contributes to reduce soil compaction by reducing passes with heavy vehicles through the field since bale bundles rest paired on the ground. Moreover, as both first and second bale bundles are formed inside the same bundling chamber, they undergo the same packing process so that pack compactness is guaranteed. Besides, unload of bale bundles can take place simultaneously.

According to a second aspect, the present invention provides a method for forming a plurality of bale bundles, for example a first and second bale bundles, within a bundling chamber, wherein each bale bundle comprises a plurality of bale layers, the method comprising the steps of;
a) conveying a first incoming bale to a first bale loading position and a second incoming bale to a second bale loading position located at a bale entrance of the bundling chamber,
b) displacing said first and second incoming bales from the first and second bale loading positions into respective first and second enclosures arranged inside the bundling chamber,
c) forming one of said plurality of bale layers within the respective first and second enclosures by successively displacing a number of incoming bales from the respective bale loading positions into the respective first and second enclosures,
d) displacing a bale layer formed within the respective first and second enclosures to clear respective volume portions within the first and second enclosures,
e) receiving a number of new incoming bales within the cleared volume portions of the first and second enclosures to successively form new respective bale layers within the respective first and second enclosures,
f) forming the first and second bale bundles by successively displacing a number of said bale layers formed within said respective first and second enclosures, and
g) simultaneously or sequentially unloading said first and second bale bundles from the respective first and second enclosures of the bundling chamber.

According to a third aspect, the present invention provides a bale bundling machine to be towed by a tractor and suitable for using with the claimed bundling system.

In the claimed bale bundling system, first and second incoming bales are pick up from the ground and conveyed to a bale entrance, for example, conveyed adjacent to a bale entrance of the bundling chamber, for example, in front of a bale entrance or substantially below a bale entrance of the bundling chamber, to positioning the first incoming bale to the first bale loading position "P1" and the second incoming bale to the second loading position "P2". Preferably, said first and second bale loading positions "P1" and "P2" are arranged in series at the bale entrance or adjacent to the bale entrance, for example, in front or substantially below the bale entrance of the bundling chamber.

According to a preferred embodiment of the claimed system, the bale conveying device comprises;
a first and second bale conveyor units arranged in series to respectively convey the first incoming bale to the first bale loading position "P1" and the second incoming bale to the second bale loading position "P2",
first bale detection means to detect presence of the first incoming bale at the first bale loading position "P1",
wherein the processing and control means are configured to send a stop signal to the first bale conveyor unit to stop actuation of the first bale conveyor unit upon receiving a signal coming from the said first bale detection means, and
second bale detection means to detect presence of the second incoming bale at the second bale loading position "P2",
wherein the processing and control means are configured to send a stop signal to the second bale conveyor unit to stop actuation of the second bale conveyor unit upon receiving a signal coming from the said second bale detection means.

Alternatively, according to one embodiment of the claimed bale bundling system, the bale conveying device comprises;
one bale conveyor unit covering the first and second loading positions "P1", "P2", for example one belt conveyor unit, arranged to convey the first incoming bale to the first bale loading position "P1" and the second incoming bale to the second bale loading position "P2" and,
bale detection means to detect presence of the second incoming bale at the second bale loading position (P2),
wherein the processing and control means are configured to send a stop signal to the at least one bale conveyor unit to stop actuation of the bale conveyor unit upon receiving a signal coming from the said bale detection means.

Preferably, according to the preferred embodiment with first and second conveyor units, the bale detection means to detect presence of the second incoming bale comprises a retractable member mounted to oscillate from an initial resting position to a working position in between the said first and second bale loading positions "P1", "P2", wherein said second incoming bale is able to contact a surface of said retractable member at the second bale loading position "P2".

Alternatively, for the embodiment with one bale conveyor unit covering the first and second bale loading positions "P1", "P2", the bale detection means to detect presence of the second incoming bale comprise at least one proximity sensor and/or an inductive sensor. The proximity sensor may be configured by way of a photocell sensor.

According to one embodiment of the claimed system;
said first and second enclosures inside the bundling chamber are configured and arranged to respectively form said first and second bales bundles disposed horizontally or tilted in a longitudinal direction "Y" of the bundles,
said at least one bale pressing device includes at least one horizontally displaceable bale platform mounted to displace bale layers from a front position to a rear position within the respective first and second enclosures of the bundling chamber, and
preferably, the bundling chamber comprises a separating wall arranged in between the first and second enclosures.

This embodiment has the advantage that the first and second bale bundles are formed inside a horizontally or tilted arranged bundling chamber including the first and second enclosures in a longitudinal direction "Y" of the bundles.

Alternatively, according to another embodiment;
the first and second enclosures inside the bundling chamber are configured and arranged to respectively form said first and second bales bundles disposed vertically in a longitudinal direction "Y" of the bundles,
said at least one bale pressing device includes at least one vertically displaceable bale-lifting platform, preferably one vertically displaceable bale-lifting platform, mounted to displace bale layers from a lower initial position to an upper position within the respective first and second enclosures of the bundling chamber and,
wherein the system further comprises a bale retaining device for retaining in the upper position respective bale layers formed within the first and second enclosures when the bale-lifting platform recovers its initial lower position.

This embodiment has the advantage that the first and second bale bundles are formed inside a vertically arranged bundling chamber including the first and second enclosures. The vertically arranged bundling chamber has the main advantage that allow both first and second bale bundles inside the first and second enclosures to be formed in a machine with very small length, unlike the type of machine that gather the bales forming a pack that extends horizontally on the frame.

Preferably, the first and second enclosures of the bundling chamber comprise respective guide members arranged to guide displacement of the first and second incoming bales towards respective reference contact surfaces inside the first and second enclosures upon operation of said at least one pushing device.

The reference contact surfaces help positioning the incoming bales inside the respective first and second enclosures.

For the embodiment wherein the first and second enclosures inside the bundling chamber are configured and arranged to respectively form said first and second bales bundles disposed vertically in a longitudinal direction "Y" of the bundles, said at least one vertically bale-lifting platform is provided with said guide members to respectively guide transverse movement of the incoming bales within the respective first and second enclosures until contacting with respective reference contact surfaces.

Advantageously, a first group of said guide members is arranged to guide transverse movement of the incoming bales inside the first enclosure until contacting with a first reference contact surface, and with a second group of said guide members arranged to guide transverse movement of the incoming bales inside the second enclosure until contacting with a second reference contact surface.

For one embodiment, said guide members are arranged on the surface of the bale-lifting platform to guide transverse movement of the incoming bales within the respective first and second enclosures until contacting respective side walls of the bundling chamber, each of said side walls acting as respective reference contact surface inside the bundling chamber.

For another embodiment, the bale-lifting platform comprises a separating wall, preferably a removably attached separating wall, arranged in between the first and second enclosures.

Again preferably, said guide members are arranged on the bale-lifting platform to guide transverse movement of at least one of said first or second incoming bales within the respective first and second enclosures until contacting with said separating wall, said separating wall being susceptible to act as a reference contact surface for at least one of said incoming bales inside the first and/or second enclosures.

Advantageously, said guide members are mounted pivotable about a substantially vertical axis on the surface of the bale-lifting platform for a user to be able to modify the transverse direction of movement of the incoming bales within the respective first and second enclosures.

Preferably, for embodiments wherein said first and second enclosures inside the bundling chamber are configured and arranged to respectively form said first and second bales bundles disposed vertically, horizontally or tilted in a longitudinal direction "Y" of the bundles, the bale bundling system comprises a plurality of binding units distributed aligned in correspondence with the bale entrance of the bundling chamber, wherein a first group of said plurality of binding units are arranged in correspondence with the first enclosure and a second group of said plurality of binding units are arranged in correspondence with the second enclosure, and wherein each of the binding units of the respective first and second groups are able to provide a turn of yarn on the respective first and second bale bundles.

The expression a plurality of binding units distributed aligned in correspondence with the bale entrance of the bundling chamber should be understood said plurality of binding units are distributed or arranged in relation to the bale entrance to allow formed bale layers within the respective first and second enclosures to contact a length of yarn of the binding units when the at least one bale pressing device is actuated to successively displace a number of said formed bale layers inside the respective first and second enclosures.

According to the embodiment of the bale building system wherein the first and second bale bundles are formed inside a vertically arranged bundling chamber, the at least one bale pushing device comprises at least one pushing member arranged to introduce the incoming bales from its respective first and second bale loading positions into the respective first and second enclosures of the bundling chamber.

Alternatively, for the embodiment wherein the first and second bale bundles are formed inside a horizontally or tilted arranged bundling chamber, the at least one bale pushing device comprises at least one pushing member configured and arranged to introduce, or to lift at least partially, the incoming bales from its respective first and second bale loading positions into the respective first and second enclosures of the horizontally or tilted bundling chamber.

Advantageously, the claimed bale bundling system comprises at least two bale pushing devices, each of said bale pushing devices comprising one of said at least one pushing member arranged to respectively introduce the first and second incoming bales into its respective first and second enclosures of the bundling chamber.

Again advantageously, for the embodiment of the bale building system wherein the first and second bale bundles are formed inside a vertically arranged bundling chamber, said at least one pushing member, for example a pushing plate, comprises a compressing surface adapted to provide an active compressing force on respective formed bale layers inside the first and second enclosures, and said processing and control means are configured to send a compaction signal to said bale pushing device for said compressing surface to apply the active compression force on the respective formed bale layers while the lifting platform vertically displaces the respective bale layers inside the first and second enclosures.

Preferably, the compressing surface comprises a pushing member or pushing plate sized so as to provide a contact surface with the bales equal to or greater than 50 cm$^2$, advantageously, a contact surface comprised between 200 cm$^2$ and 5000 cm$^2$ suitable to provide the aforementioned active compression force on the bales in the transverse "X" direction of the pack, where preferably, the active compression force that is applied to the bale layers is comprised between 0.05 Kg/cm$^2$ and 10 Kg/cm$^2$.

Thanks to these features, an active compression force is applied on the respective bale layers formed inside the first and second enclosures, in a transverse "X" direction and against a rear wall of the bundling chamber while the lifting platform displaces both layers to the upper position.

For the embodiment of the bale building system wherein the first and second bale bundles are formed inside a vertically arranged bundling chamber, the bale bundle system and the bale bundle machine comprises at least one pushing device and said pushing device comprises at least one pushing member and a respective parallelogram mechanism to actuate the respective pushing member, and advantageously, each pushing member is articulately attached to pivoting arms of the parallelogram mechanism, and the respective parallelogram mechanism is mounted so that the pivoting arms and the respective pushing member hang above the bale entrance in correspondence with the first and second enclosures of the bundling chamber.

The parallelogram mechanism allows each pushing member to be oscillated by maintaining a substantially vertical position inside the first and second enclosures of the bundling chamber, maximizing the contact surface with the bales throughout the travel. Advantageously, the pivot axes of the pivoting arms of each parallelogram mechanism are mounted such that the arms are susceptible to being collected in a rear position so that the bales can be positioned opposite the entrance of the bundling chamber. In the forward position, each pushing member penetrates the first and second enclosures of the bundling chamber while maintaining contact with the bales.

Preferably, the bundling chamber comprises at least a rear wall arranged to act as a bale bundle unloading door for the first and second enclosures.

For the embodiment of the bale building system wherein the first and second bale bundles are formed inside a vertically arranged bundling chamber, said at least rear wall of the bundling chamber comprises at least a rear wall portion arranged to simultaneously act as a lower unloading door for the first and second enclosures, wherein said at least rear wall portion is mounted to pivot clockwise to unload respectively and simultaneously the first and second bale bundles from the first and second enclosures.

Alternatively, for the embodiment of the bale building system wherein the first and second bale bundles are formed inside a horizontal or tilted arranged bundling chamber, the bundling chamber comprises a rear wall and a first and a second pivotable unloading rear platforms associated to the rear wall, said pivotable unloading rear platforms being configured and arranged to allow said first and second bale bundles to be unloaded simultaneously or sequentially from the respective first and second enclosures.

For one embodiment, said pivotable unloading rear platforms are configured and arranged to allow each of said first and second bale bundles to pivot with respect its longitudinal axis "Y" for said first and second bundles to be unloaded on flat from the respective first and second enclosures of the bundling chamber.

Preferably, for the embodiment of the bale building system wherein the first and second bale bundles are formed inside a vertically arranged bundling chamber, the bale bundling system comprises fixing means for blocking the opening of the rear wall portion acting as unloading door when the compressing surface applies the compression force on the bales and against the rear wall of the bundling chamber.

Advantageously, according to one embodiment, the fixing means comprise:
  at least one unloading door fastening member,
  a force multiplier mechanism associated with the fastening member, and
  a fluid-dynamic element, or an electromechanical device, arranged to actuate the multiplier mechanism.

In this way, the fastening member acts to prevent the unloading door from opening when the compressing surface applies the active compression force on the bale layers and against the rear wall of the bundling chamber. The electromechanical device may comprise, for example, a motor or a magnetic interlock.

For the embodiment of the bale building system wherein the first and second bale bundles are formed inside a vertically arranged bundling chamber, the interior space of first and second enclosures of the bundling chamber comprises a width ("a") in a transverse direction ("X") of the respective bale bundle that is equal to or less than the value resulting from the sum of a nominal width ("A") of the bales forming a bale layer inside the first and second enclosures. For example, the width "a" of the bundling chamber corresponding to the width of each of the first and second enclosures, can be designed with a value of 1280 mm less than the value of 1380 mm resulting from the sum of the nominal width "A" of 460 mm of three bales forming a bale layer. According to another example, the width "a" of the bundling chamber corresponding to the width of each of the first and second enclosures, can be designed with a value of 890 mm less than the value of 920 mm resulting from the sum of the nominal width "A" of 460 mm of two bales forming a bale layer.

In this way, the front and rear walls of the first and second enclosures of the bundling chamber itself are susceptible to applying a passive compression force on the bales in a transverse direction once the bales lose contact with the compressing surface of the at least one pushing device. In this way, the claimed system makes it possible to obtain extremely compact bale bundles, both in the transverse and longitudinal direction of the pack. The passive compression force applied by the front and rear walls of the bundling chamber limits the transverse expansion of the bale bundles when the lifting platform applies an active compression force, at the end of the loading cycle. As a result, first and second bale bundles can be obtained wherein breakage of the straps of the bales, frequent in the systems of the state of the art, is avoided.

Preferably, the system comprises an adjusting mechanism for adjusting the width "a" of the bundling chamber to modify the width "a" of the first and second enclosures of the bundling chamber, based on the nominal width "A" of the bales forming the bale layers.

Thanks to this, the system is suitable for use with bales of different nominal widths "A," for example, of nominal width "A" of 440 mm, 460 mm, 500 mm, or 560 mm. Thus, depending on the nominal width "A" of the bale, the user can adjust the width "a" of the first and second enclosures of the bundling chamber so that the passive compression force applied to the bales of the pack is optimal.

According to one embodiment, the adjustment mechanism comprises the rear wall of the bundling chamber mounted displaceable on at least one pair of guides to be able to adjust the width "a" of the interior space of the first and second enclosures of the bundling chamber as a function of the nominal width "A" of the bales forming the bale layers inside the first and second enclosures. Optionally, the adjusting mechanism additionally comprises a bale-lifting platform extension removably attachable to the existent vertically displaceable bale-lifting platform.

Preferably, for the embodiment of the bale building system wherein the first and second bale bundles are formed inside a vertically arranged bundling chamber, the rear wall of the bundling chamber comprises the rear wall portion acting as the lower unloading door pivotally mounted clockwise on at least one pair of mounted skids displaceable on at least one pair of lower guides, and a rear wall portion acting as the upper door, wherein said rear wall portion acting as an upper door is pivotally disposed counterclockwise on at least one pair of mounted skids displaceable on at least one pair of upper guides.

Thus, it is the rear wall of the chamber itself that defines the lower door and the upper unloading door for the first and second enclosures. The closing of the two doors is ensured by a fixing device that acts by blocking the opening of the doors, so that both doors are able to withstand the active compression force of the compressing surface of the pushing device.

Once more, for the embodiment where the bale bundles are formed inside vertically arranged first and second enclosures of a bundling chamber, the bale bundling system includes at least one retaining device for retaining or holding the bale layers in the upper position when the lifting platform recovers its initial lower position.

Preferably, at least one of said bale retaining devices is articulately attached to a wall of the bundling chamber, for example, articulately attached to the rear wall of the bundling chamber.

Advantageously, the at least one retaining device comprises at least one retaining member arranged for retaining bales in the first and second enclosures in the upper position.

Preferably, said at least one retaining member is associated with a parallelogram mechanism so that the retaining member is susceptible to being displaced linearly along the transverse "X" direction of the bundles when the parallelogram mechanism is actuated for retaining the bales inside the first and second enclosures of the bundling chamber.

Thanks to these characteristics, the retaining member acquires a deployed position that is susceptible of contacting the bales laterally and uniformly within the first and second enclosures of the bundling chamber, providing optimal fastening of the first and second bale bundles while the machine is travelling on the irregular surface of the field.

Preferably, for the embodiment of the bale building system wherein the first and second bale bundles are formed inside a vertically arranged bundling chamber, the bundling system comprises at least one ejector device for ejecting the first and second bale bundles from the first and second enclosures, said at least one ejector device including at least one ejector member arranged in correspondence with the first enclosure and at least one ejector member arranged in correspondence with the second enclosure, wherein said ejector members, preferably, each comprise a first member section associated with a respective front wall of the first and second enclosures of the bundling chamber, and a second member section associated with a respective upper wall of the first and second enclosures of the bundling chamber.

Advantageously, the second member section of each of the ejector members is articulately attached to the respective upper wall of the first and second enclosures of the bundling chamber, so that each ejector member pivots with respect to the front wall and the upper wall of the first and second enclosures of the bundling chamber to accompany the respective removal of the first and second bale bundles when the ejector device is actuated.

The present invention provides a bale bundling system and method for forming a plurality of bale bundles, in particular, first and second bundles of hay bales or similar material which, in their different embodiments, greatly improves the existing systems and methods in the state of the art, allowing simultaneously unloading two extremely compact bale bundles formed by bales that can be from 750 mm to 900 mm in nominal length "L".

In practice, the claimed bale bundle machine and the claimed system are suitable to form first and second bale bundles with bales of a nominal length "L" comprised between 600 mm and 1000 mm, for example, bales of a nominal length "L" comprised between 750 mm and 900 mm.

For a particular use, the claimed machine can be easily adapted to be also suitable to form a single bale bundle formed by bales of nominal length "L" comprised between 600 mm and 1500 mm. In this case, for the embodiment wherein said first and second enclosures inside the bundling chamber are configured and arranged to respectively form said first and second bales bundles disposed vertically in a longitudinal direction "Y" of the bundles, the user may have to modify the arrangement of the first and second group of guide members to guide transverse movement of one incoming bale until contacting with a side wall of the bundling chamber acting as a reference contact surface for the incoming bales. Similarly, it may be necessary to keep the bale detection means for the second incoming bale inoperative. Likewise, for this particular use it may be necessary to left one or two of the binding units of both the first and second group of binding units without yarn, or even leaving all the binding units arranged in correspondence with the second enclosure without yarn (in case the length "L" of the single incoming bale does not extend to the second bale loading position "P2").

For the embodiment wherein said first and second enclosures inside the bundling chamber are configured and arranged to respectively form said first and second bales bundles disposed vertically in a longitudinal direction "Y" of the bundles, the bale layers of the first and second bale bundles may be formed by two, three or more bales on which an active compression force is applied in the transverse direction "X" and against the respective rear wall of the first and second enclosures of the bundling chamber by means of one or two pushing members of at least one or two pushing devices. At the end of the loading cycle, a single lifting platform can apply an active compression force on the bale layers in the longitudinal direction "Y" of the first and second bale bundles to compress vertically and simultaneously both bale bundles inside a single bale bundling chamber.

With the claimed system first and second bale bundles can be unloaded from the same bundling chamber and exit the machine smoothly as it moves forward so that both first and second bale bundles may rest paired on the ground of the field one next to the other ready for collection. Thus, the claimed invention significantly reduces time needed for bale collection and what is more important, it significantly contributes to reduce soil compaction. Moreover, as both first and second bale bundles are formed inside the same bundling chamber, they undergo the same packing process so that bale bundle compactness is guaranteed.

For the embodiment wherein said first and second enclosures inside the bundling chamber are configured and arranged to respectively form said first and second bales bundles disposed horizontally or tilted in a longitudinal direction "Y" of the bundles, the present invention provides a method for forming said bale bundles, wherein step g) comprises simultaneously or sequentially unloading said first and second bale bundles from the respective first and second enclosures by means of respective first and second pivotable unloading rear platforms.

The sequentially unloading of bale bundles with the bale bundling system of the present invention allows the bale bundles to rest on the ground arranged in a staggered pattern so that farmers can use collector and stacker machines, such as for example the AutoStack® machine of Arcusin S.A.

company, to reduce time needed for bale collection and maximize the efficiency of the bale logistics.

BRIEF DESCRIPTION OF THE DRAWINGS

For the better understanding of the description made herein, a set of drawings has been provided wherein, schematically, and solely by way of a non-limiting example, several practical cases of embodiments are represented.

FIG. 12 is a schematic section view of the bundling machine of FIG. 1 showing both bale layers of the first and second enclosures retained in an upper position while the bale-lifting platform recovers its initial lower position. At least one bale retaining device, which is articulately attached to the rear wall of the first and second enclosures of the bundling chamber, is in an active position, holding the bale layers in the upper position.

FIG. 25 shows first and second bale bundles unloaded from the bale bundling machine of FIG. 21 and arranged on edge and in pairs on the ground.

FIG. 27 shows first and second bale bundles unloaded from the bale bundling machine of FIG. 23 and arranged on edge and in a staggered pattern on the ground.

FIG. 28 shows first and second bale bundles unloaded from the bale bundling machine of FIG. 24 and arranged on flat and in a staggered pattern on the ground.

Description of Preferred Embodiments

Figure 1:
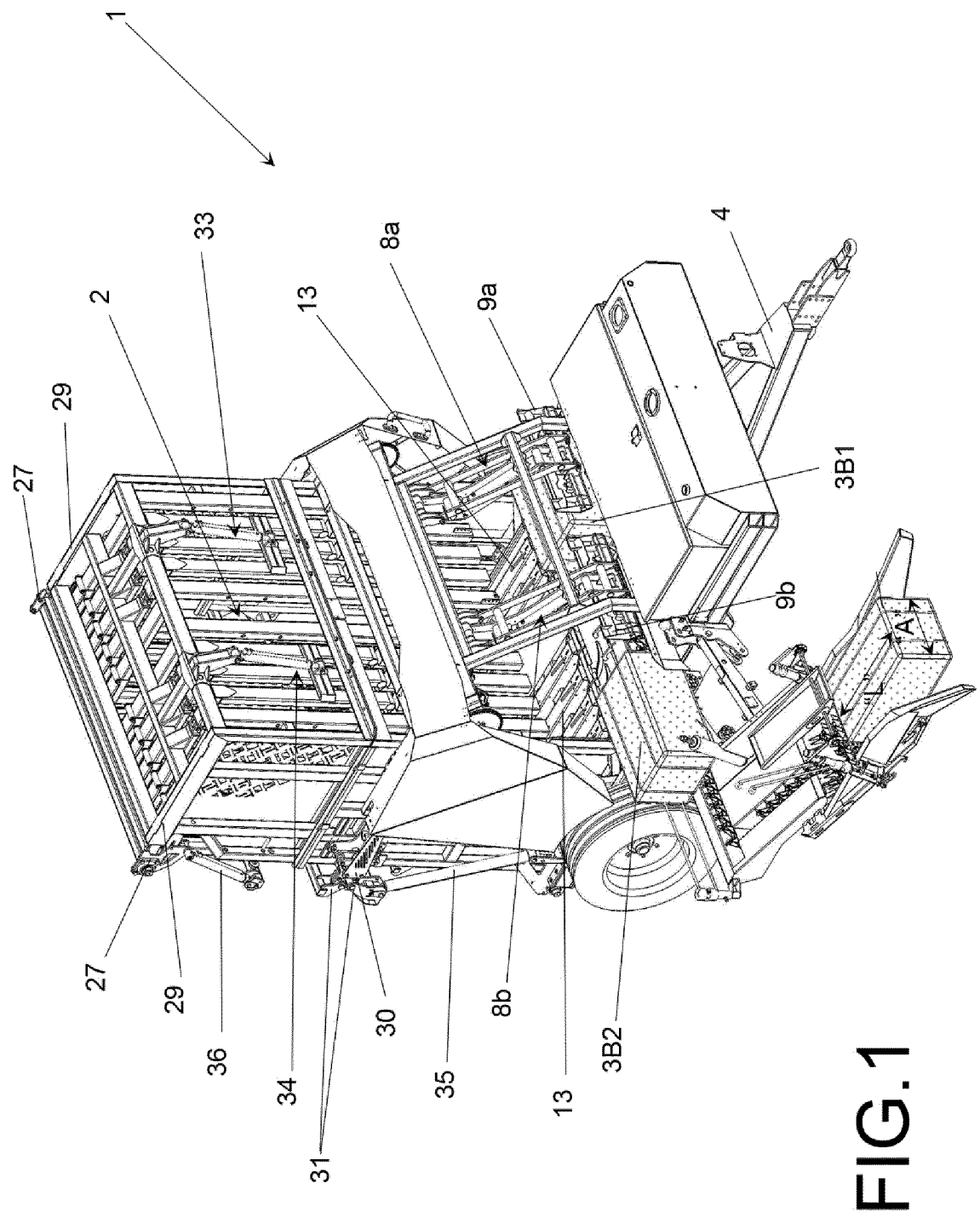
FIG. 1 is a perspective view of an embodiment of the bundling machine for forming bale bundles of hay or similar material, incorporating the claimed bundling system. The figures shows an embodiment including a first and second enclosures configured and arranged to be able to respectively form first and second bale bundles disposed vertically in a longitudinal direction "Y", a conveying device provided with two conveyor units including chain-drawn disks for displacing the bales from a pick up entry to a first and second bale loading positions arranged in series at a bale entrance of the bundling chamber, two bale pushing devices, each of them with a pushing member to displace first and second incoming bales into the first and second enclosures, and a bale pressing device including a bale-lifting platform mounted vertically displaceable inside the first and second enclosures to displace a bale layer from a lower initial position to an upper position.

Different embodiments of the claimed bundling system and bale bundling machine incorporating the claimed system are described below, with reference to FIGS. 1 to 28.

The present invention relates to a bundling machine 1 incorporating the claimed bundling system permitting a first bale bundle "B1" and a second bale bundle "B2" to be formed inside a bundling chamber 2, wherein each bale bundle "B1" and "B2" includes a plurality of layers 3 of bales 3B1 and 3B2. The bundling chamber 2 comprises a first enclosure 2a configured and arranged to form the first bale bundle "B1" and a second enclosure 2b configured and arranged to form the second bale bundle "B2".

For the embodiment described in FIGS. 1 to 16, the bundling chamber 2 has the peculiarity that it is disposed vertically on the frame 4 of the machine 1 to form bale bundles "B1" and "B2" arranged vertically in the longitudinal direction "Y" inside the bundling chamber 2 by using the claimed bale system. However, according to the embodiment shown in FIGS. 17 to 24, the bundling chamber may be disposed horizontally or tilted on the frame of the machine 1 to form bale bundles "B1" and "B2" arranged horizontally or tilted in the longitudinal direction "Y" of the bale bundles.

For the illustrated embodiment of FIGS. 1 to 16, the entrance of the bundling chamber 2 incorporates a conveying device 5 configured and arranged to convey a first incoming bale 3B1 to a first bale loading position P1 and a second incoming bale 3B2 to a second bale loading position P2.

Figure 2:
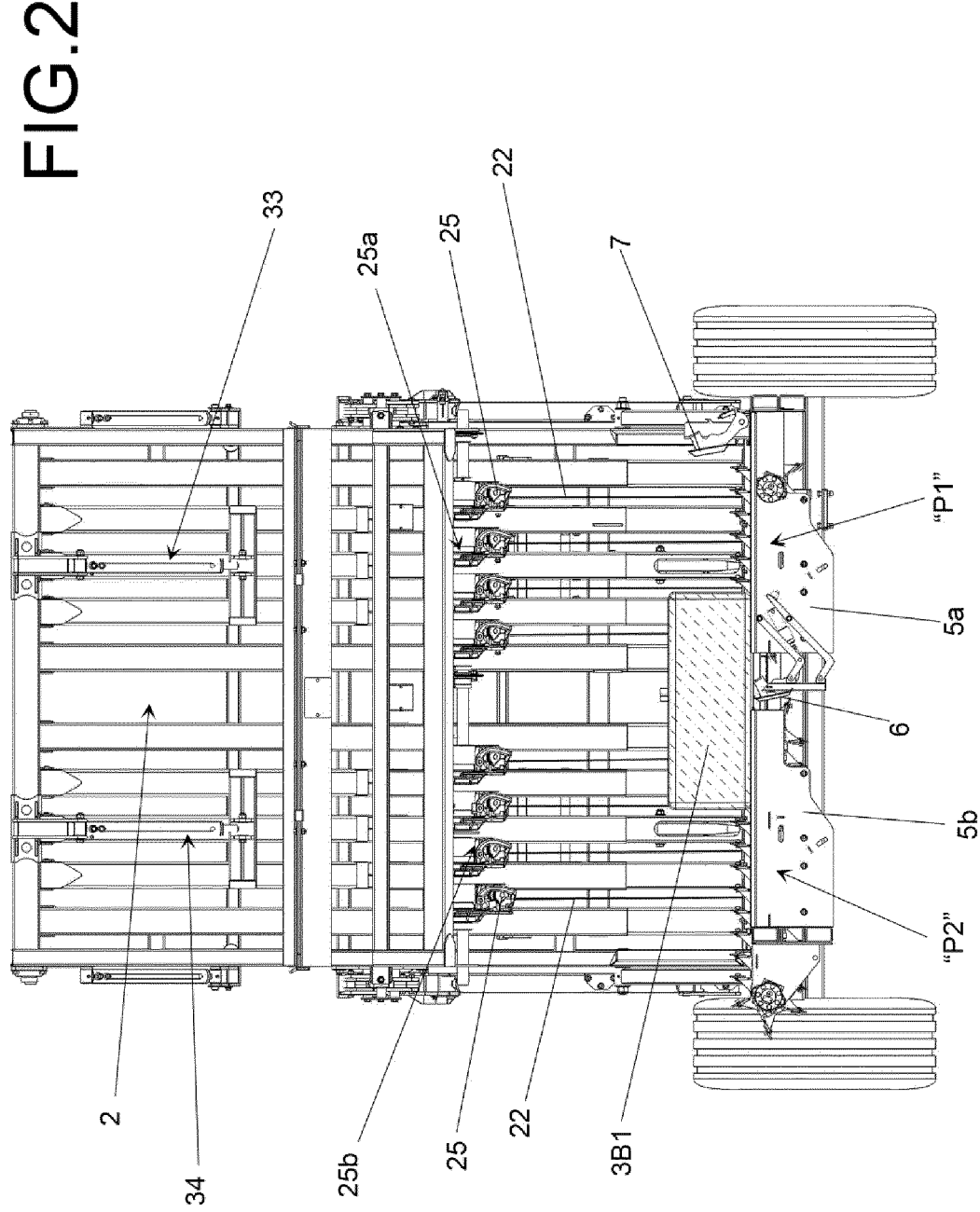
FIG. 2 is a front view of a part of the bundling machine of FIG. 1 devoid of the bale pushing devices to show the entrance of the bundling chamber wherein the first and second conveyor units are arranged in series at the respective first and second bale loading positions. It also shows a retractable member responsible for detecting presence of the second incoming bale hidden in a lower position in between the first and second conveyor unit for allowing passage of the first incoming bale, and two groups of yarn binding units arranged in correspondence with the first and second enclosures of the bundling machine of FIG. 1.
Figure 3:
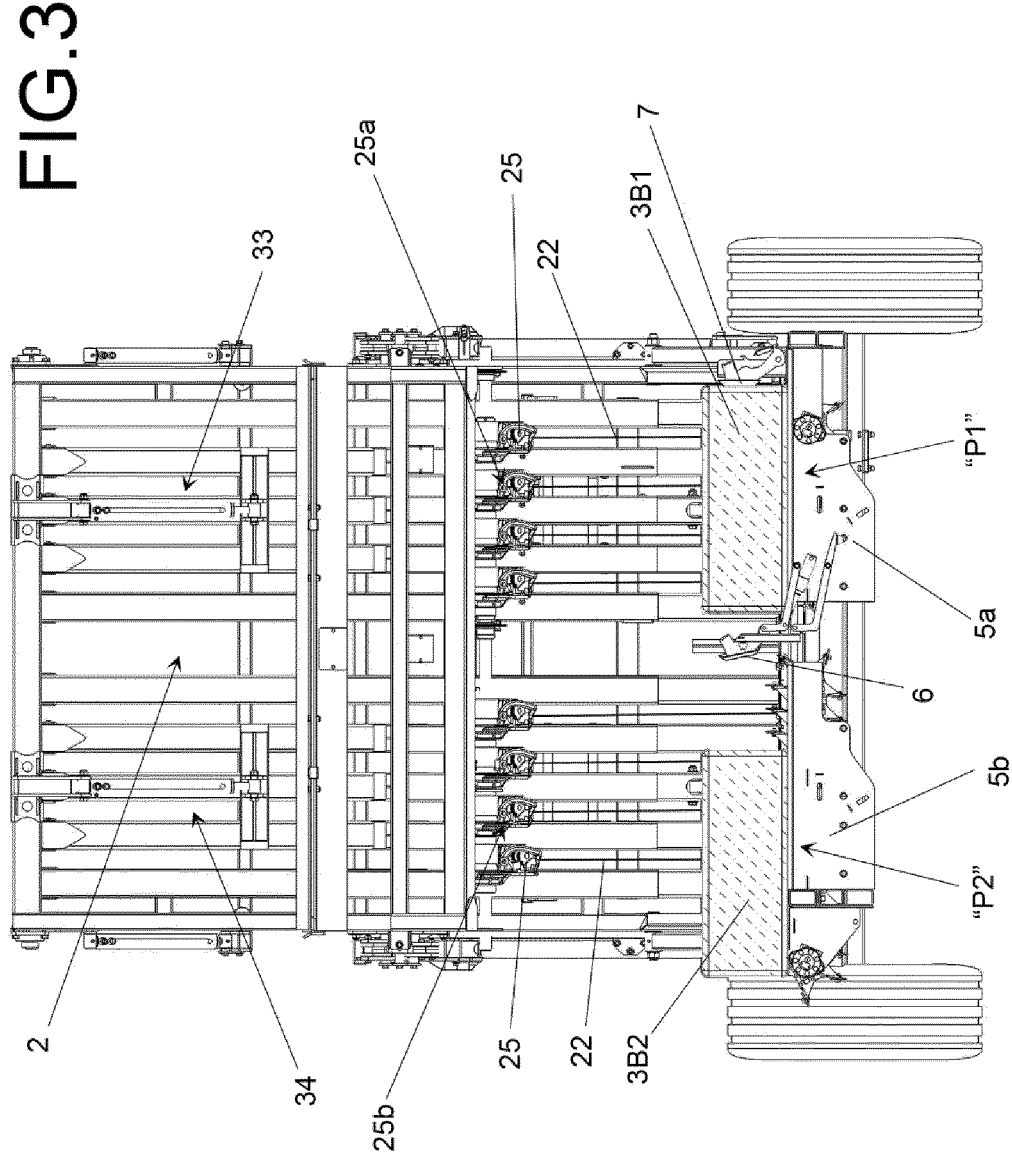
FIG. 3 shows the front view of FIG. 2 wherein the first incoming bale is positioned at the first bale loading position contacting a first bale detecting member responsible for detecting presence of the first incoming bale and for sending a stop signal to a processing and control unit to stop actuation of the first conveyor unit. This figure shows the second incoming bale on the second conveyor unit about to arrive to the second bale loading position, and the retractable member responsible for detecting presence of the second incoming bale and for sending a stop signal to the processing and control unit to stop actuation of the second conveyor unit.

For the embodiment illustrated in detail in FIGS. 2 and 3, the bale conveyor device 5 includes first and second conveyor units 5a and 5b arranged in series at the respective first and second bale loading positions P1 and P2. However, for another embodiment, both conveyor units may be differently arranged to convey the bales 3B1 and 3B2 to the bale loading positions P1 and P2. Alternatively, the bale conveyor device 5 may comprise one conveyor unit extending along the first and second bale loading positions P1 and P2 to convey first and second incoming bales 3B1 and 3B2 at the entrance of the bale bundling chamber 2. This one conveyor unit may be, for example, a belt conveyor unit (not shown) which would not damage the surface of a first incoming bale 3B1 in contact with the belt when said first incoming bale 3B1 is waiting at the first bale loading position P1 for the second incoming bale 3B2 to be conveyed to the second bale loading position P2.

In the claimed bale bundling system, the bale conveyor device 5 includes bale detection means to detect presence of either one incoming bale 3B2 or both incoming bales 3B1, 3B2 for a processing and control unit of the system to send a stop signal to the one conveyor unit or both conveyor units 5a, 5b upon receiving a stop signal coming from the bale detection means.

The illustrated embodiment of FIGS. 2 and 3 shows a retractable member 6 arranged for detecting presence of the second incoming bale 3B2 and for sending to the processing and control unit a stop signal to stop actuation of the second conveyor unit 5b. As can be seen in FIG. 2, the retractable member 6 is susceptible to be hidden in a lower position in between the first and second conveyor units 5a, 5b for allowing passage of the first incoming bale 3B1 to the first loading position "P1".

FIG. 3 shows the first incoming bale 3B1 positioned at the first bale loading position "P1" contacting a detection member 7 including a mechanical stop and a sensor to detect presence of the first incoming bale 3B1. Said detection member 7 is configured to send a stop signal to the processing and control unit to stop actuation of the first conveyor unit 5a upon detection of the first incoming bale 3B1. FIG. 3 also shows a second incoming bale 3B2 on the second conveyor unit 5b and about to arrive to the second bale loading position "P2" to contact the retractable member 6 responsible for detecting presence of the second incoming bale 3B2 and for sending a stop signal to the processing and control unit to stop actuation of the second conveyor unit 5b.

To introduce both bales 3B1 and 3B2 into the bundling chamber 2, at least one pushing device 8a is provided comprising a bale pushing member, for example a pushing plate 9a, including a compressing surface adapted and sized to apply an active compression force on bale layers 3 inside the first and second enclosures 2a, 2b.

For the illustrated embodiment of FIGS. 1 to 16, the bale bundling machine 1 as shown in FIG. 1 includes two bale pushing devices 8a, 8b wherein each bale pushing device 8a, 8b comprises a bale pushing member including a pushing plate 9a, 9b acting as a compressing surface. Each bale pushing member is articulately attached to pivoting arms 11 of a respective parallelogram mechanism 10 so that the pivoting arms 11 and the respective pushing member hang above the bale entrance of respective first and second enclosures 2a, 2b. FIG. 16 shows a perspective view of one of said pushing devices 8a including a pushing plate 9a articulately attached to the pivoting arms 11 of its parallelogram mechanism 10 hanging from a frame structure of the bundling machine 1.

Figure 4:
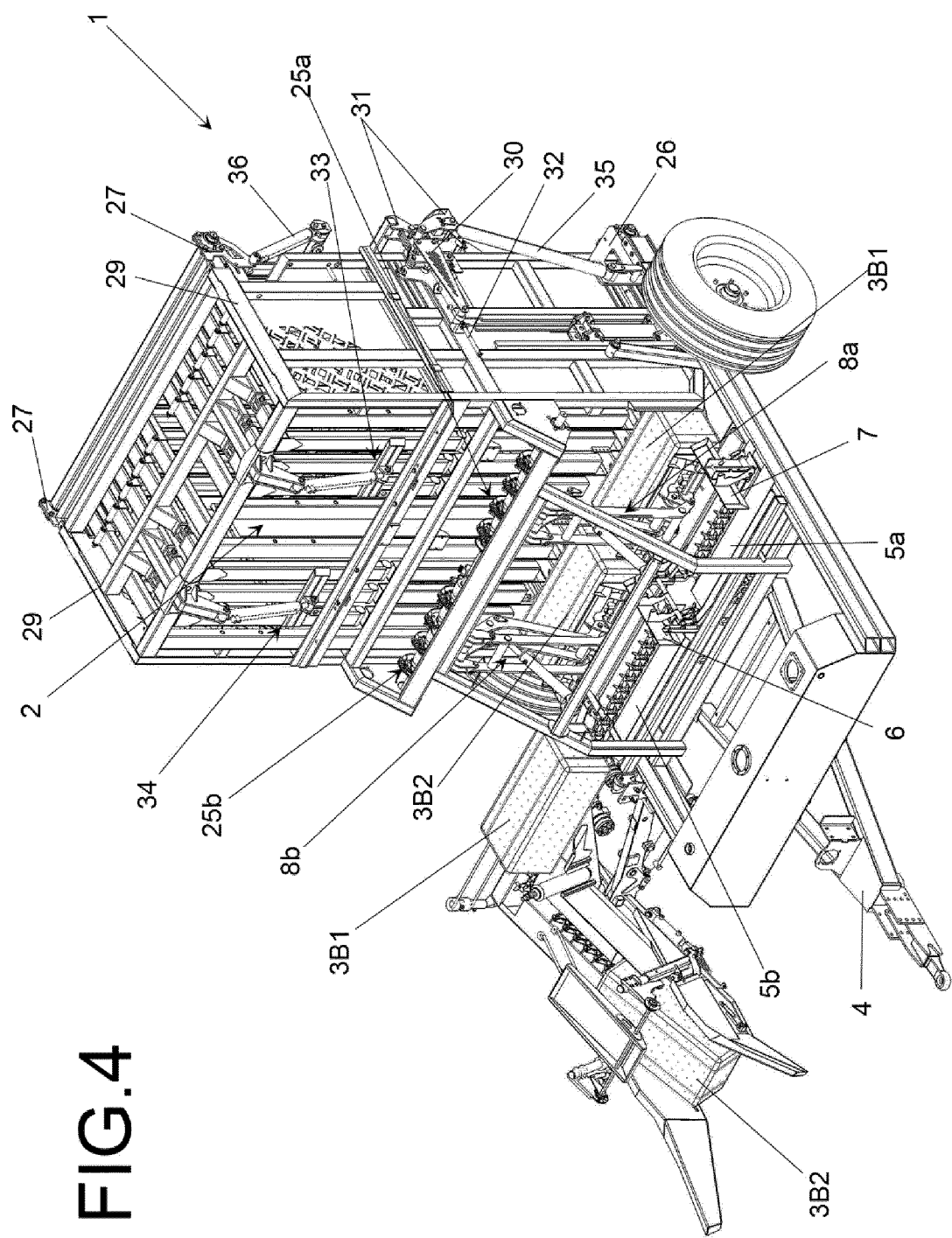
FIG. 4 is a perspective view of the bundling machine of FIG. 1 wherein first and second incoming bales are being displaced into respective first and second enclosures of the bundling chamber by respective pushing members of two bale pushing devices.

FIG. 4 is a perspective view of the bundling machine 1 of FIG. 1 wherein first and second incoming bales 3B1, 3B2 are being displaced into respective first and second enclosures 2a, 2b of the bundling chamber 2 by respective pushing members of said two bale pushing devices 8a, 8b.

Preferably, the first and second enclosures 2a, 2b of the bundling chamber 2 comprise respective guide members 12 arranged to guide transverse displacement of the first and second incoming bales 3B1, 3B2 towards respective reference contact surfaces inside the first and second enclosures 2a, 2b upon operation of the bale pushing devices 8a, 8b.

For the illustrated embodiment of the bale bundling machine 1 of FIG. 1, a first group 12a and a second group 12b of guide members are arranged on a surface of a vertically displaceable bale-lifting platform 13 defining the base of the first 2a and second 2b enclosures. Advantageously, those of guide members 12 are mounted pivotable about a substantially vertical axis on the surface of the bale-lifting platform 13 for the user to be able to pivot each guide member 12 to a predetermined position according to a predetermined guide arrangement of said guide members so as to modify displacement of the incoming bales 3B1, 3B2 within the respective first and second enclosures 2a, 2b. Alternatively, those guide members 12a, 12b are mounted in such a way that they can be removable coupled to the surface of the bale-lifting platform 13 to perform several different guide arrangements.

Figure 5:
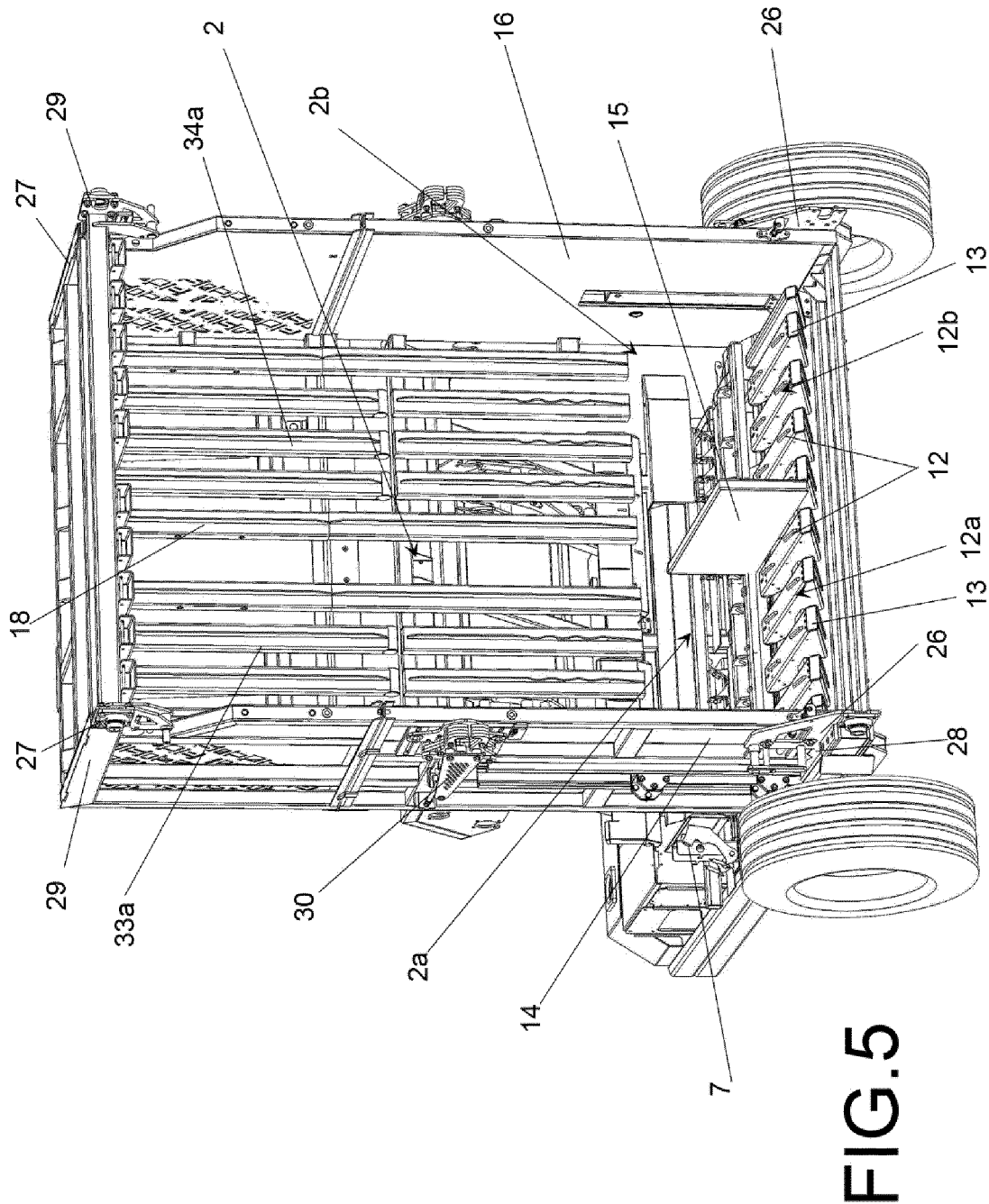
FIG. 5 is a rear perspective view of an embodiment of the bundling machine of FIG. 1 devoid of the rear wall of the bundling chamber showing interior volume portions of the first and second enclosures partially demarcated by a separating wall arranged on the vertically bale-lifting platform. This figure also shows a first group of ejector members for the first bale bundle arranged on the front wall of the bundling chamber in correspondence with the first enclosure and a second group of ejector members for the second bale bundle arranged on the front wall of the bundling chamber in correspondence with the second enclosure.
Figure 6:
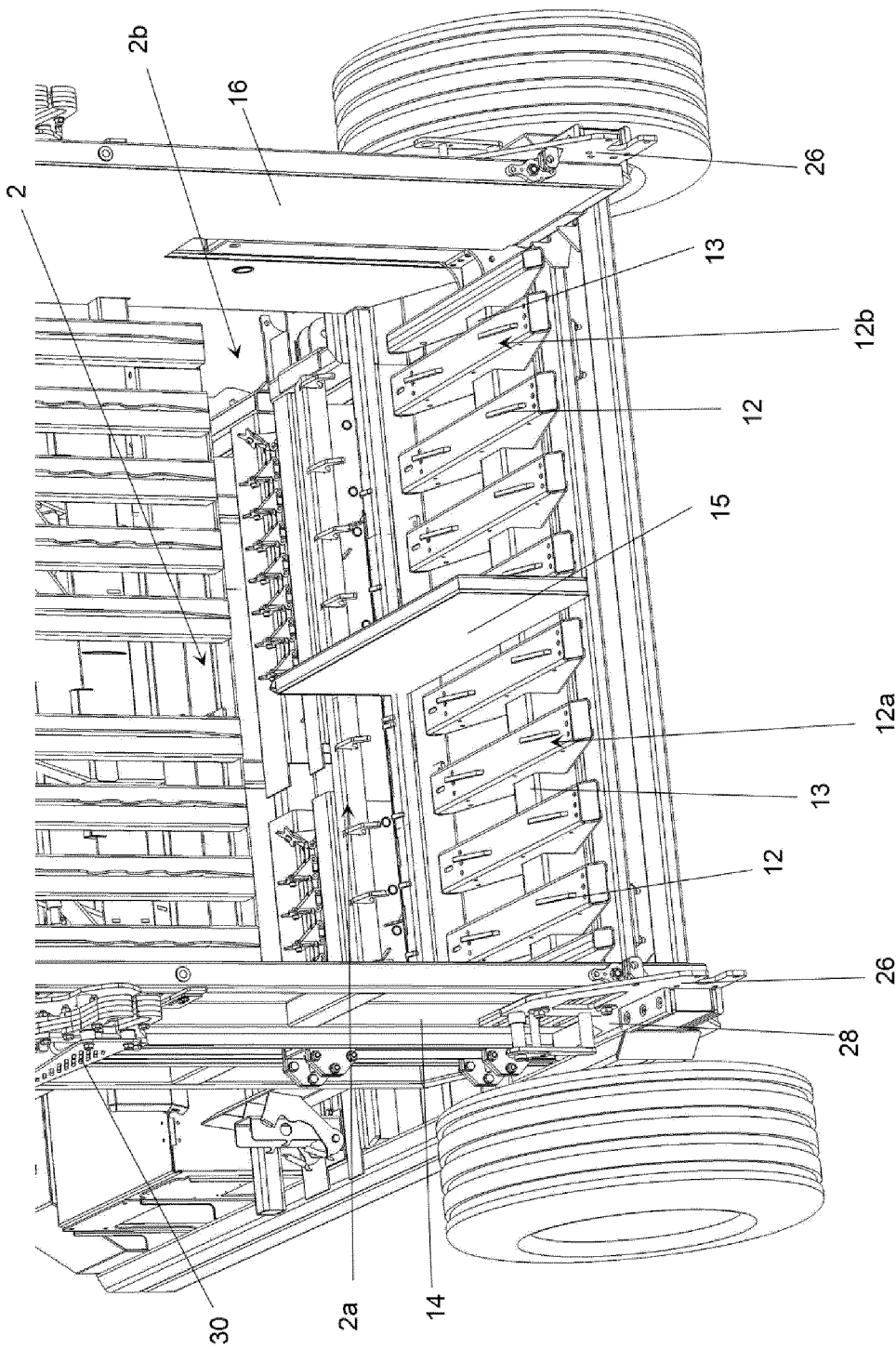
FIG. 6 is a detailed view of the bale bundling chamber of FIG. 5 including guide members arranged on the vertically bale-lifting platform to guide transverse movement of the incoming bales inside the first and second enclosures until contacting with respective reference contact surfaces. In this embodiment, a first group of guide members are arranged on the surface of the bale-lifting platform to guide transverse movement of the first incoming bale within the first enclosure until contacting with a side wall acting as a reference contact surface for said first incoming bales, and a second group of guide members arranged on the surface of the bale-lifting platform to guide transverse movement of the second incoming bale within the second enclosure until contacting with the separating wall arranged in between the first and second enclosures.
Figure 7:
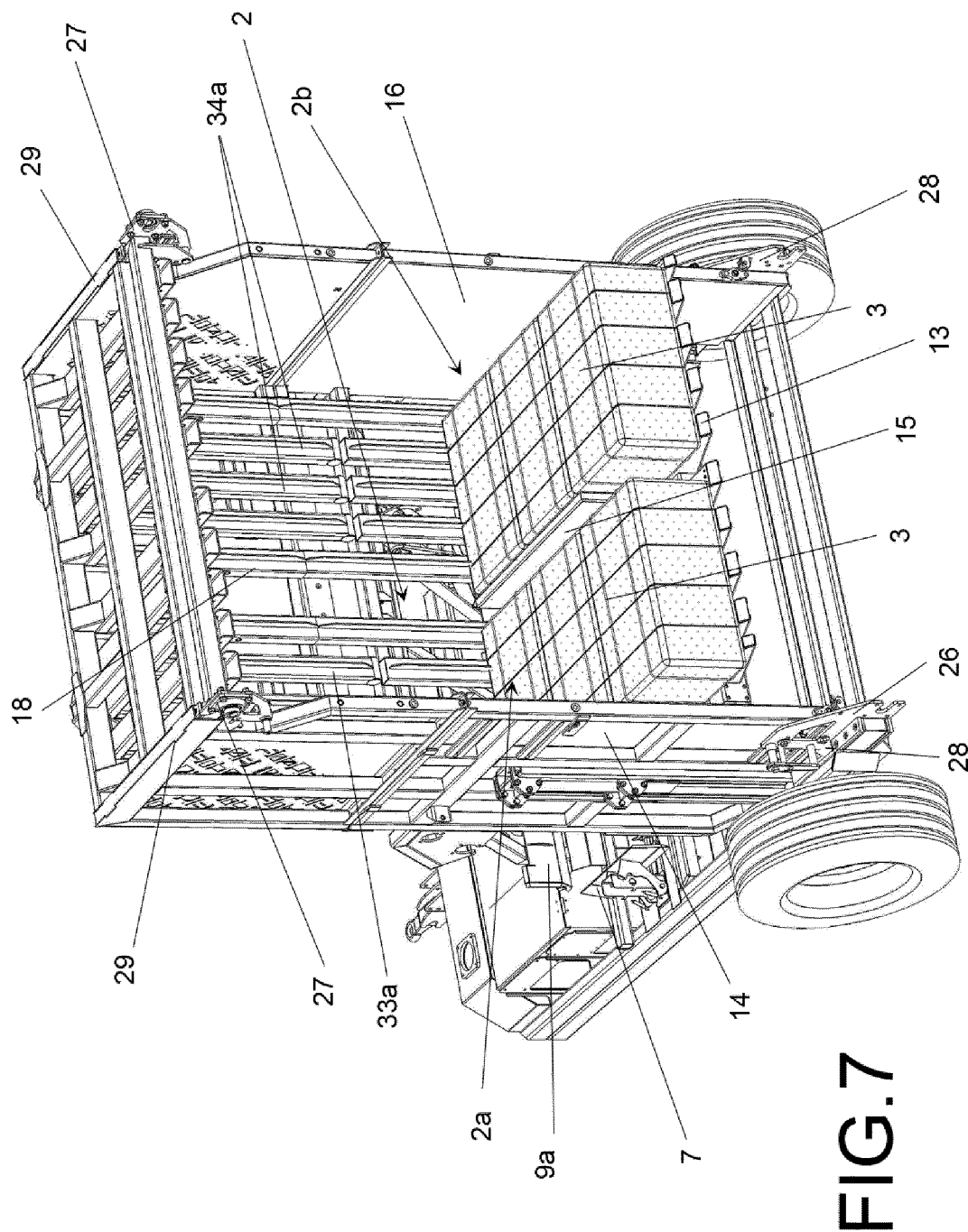
FIG. 7 is a rear perspective view of the bale bundling machine devoid of the rear wall of the bundling chamber showing respective bale layers positioned on the bale-lifting platform according to the arrangement of guide members of the embodiment disclosed in FIGS. 5 and 6. In this embodiment, the bale layer of the first bale bundle has as a reference contact surface the side wall of the bundling chamber and the bale layer of the second bale bundle has as a reference surface the separating wall arranged in between the first and second enclosures.

According to the embodiment as shown in FIGS. 5, 6 and 7, the first group of guide members 12a is arranged on the bale-lifting platform 13 to guide transverse movement of the first incoming bale 3B1 until contacting with a side wall 14 acting as reference contact surface for the incoming bales 3B1 on the first enclosure 2a, and the second group of guide members 12b is arranged on the bale-lifting platform 13 to guide transverse movement of the second incoming bale 3B2 until contacting with a separating wall 15 acting as reference contact surface for incoming bales 3B2 on the second enclosure 2b. The separating wall 15 is arranged on the surface of the bale-lifting platform 13 in between the first and second enclosures 2a, 2b to demarcate respective volume portions inside the bundling chamber 2.

Figure 8:
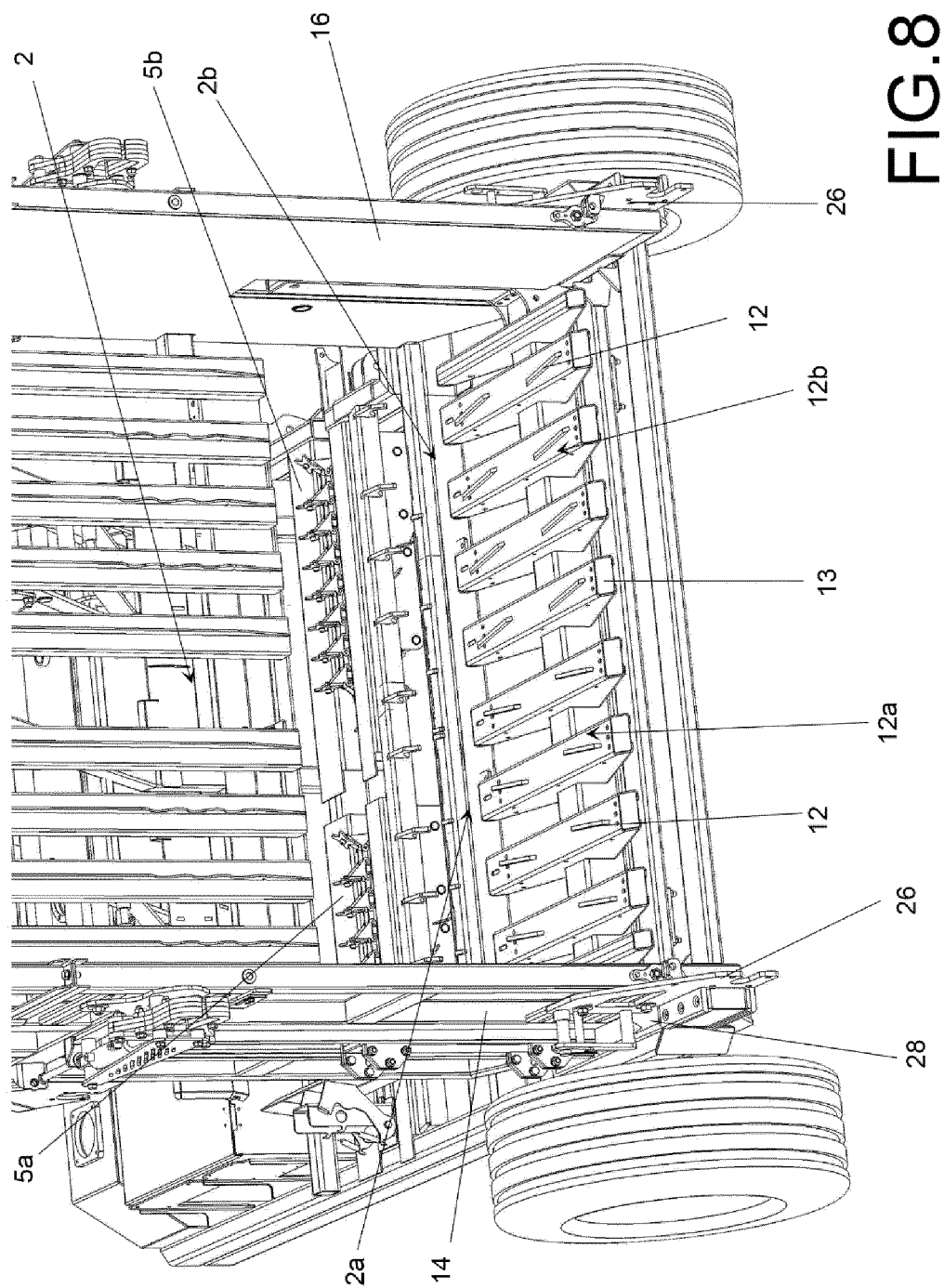
FIG. 8 is a detailed view of a bale bundling chamber devoid of the rear wall including guide members arranged on the vertically bale-lifting platform to guide transverse movement of the incoming bales inside the first and second enclosures until contacting with respective reference contact surfaces. In this embodiment, a first group of guide members are arranged on the surface of the bale-lifting platform to guide transverse movement of the first incoming bale within the first enclosure until contacting with a side wall acting as a reference contact surface for the first incoming bale, and a second group of guide members arranged on the surface of the bale-lifting platform to guide transverse movement of the second incoming bale within the second enclosure until contacting with an opposite side wall of the bundling chamber acting as a reference contact surface for the second incoming bale.
Figure 9:
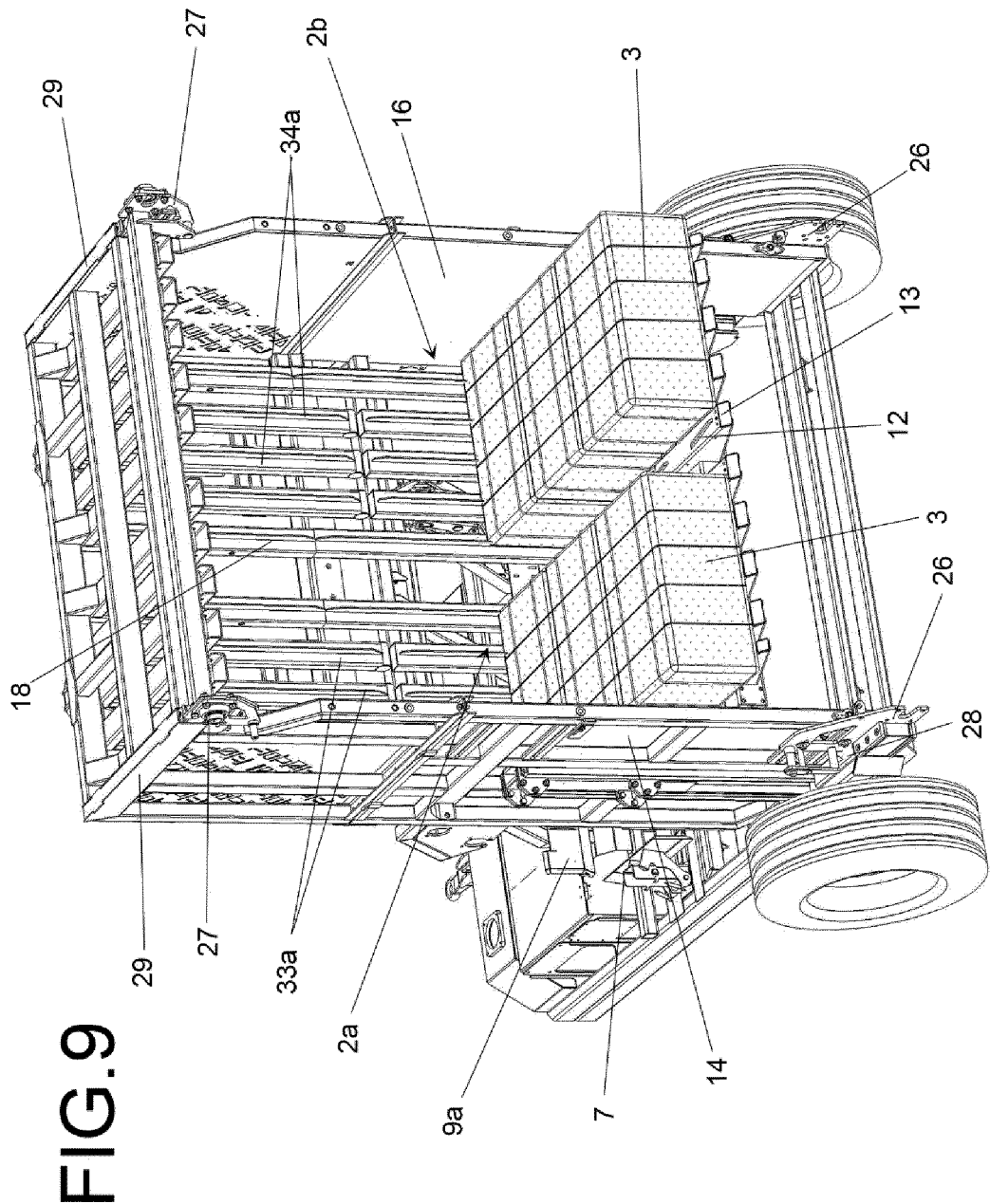
FIG. 9 is a rear perspective view of the bale bundling machine devoid of the rear wall of the bundling chamber showing respective bale layers positioned on the bale-lifting platform according to the arrangement of guide members of the embodiment disclosed in FIG. 8. In this embodiment, the bale layer of the first bale bundle has as a reference contact surface a side wall of the bundling chamber and the bale layer of the second bale bundle has the opposite side wall of the bundling chamber as a reference contact surface.

For another embodiment as shown in FIGS. 8 and 9, there is no separating wall 15. In this case, the first group of guide members 12a is arranged on the bale-lifting platform 13 to guide transverse movement of the first incoming bale 3B1 until contacting with the side wall 14 acting as reference contact surface for the incoming bales 3B1 on the first enclosure 2a, and the second group of guide members 12b is arranged on the bale-lifting platform 13 to guide transverse movement of the second incoming bale 3B2 until contacting with an opposite side wall 16 acting as reference contact surface for incoming bales 3B2 on the second enclosure 2b. This embodiment would be particularly suitable for forming two bale bundles B1, B2 when the bale bundling machine 1 includes a bale pushing device with a single bale pushing member to introduce the incoming bales 3B1 and 3B2 inside the first and second enclosures 2a, 2b.

Figure 10:
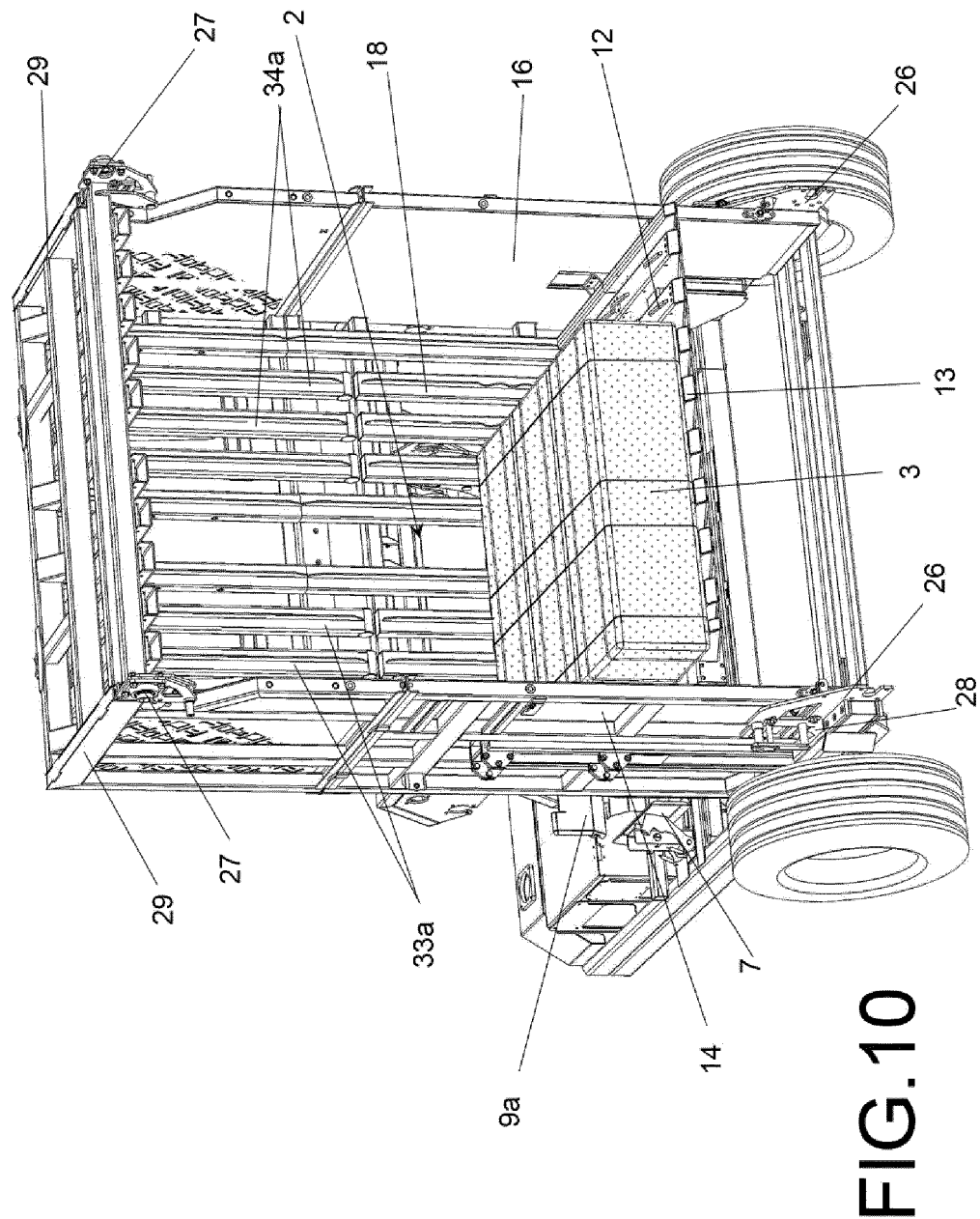
FIG. 10 is a rear perspective view of the bale bundling machine devoid of the rear wall of the bundling chamber showing a single layer of bales positioned on the bale-lifting platform according to the alternative arrangement of guide members suitable to form a single bale bundle within the first and second enclosures. For this particular use, the bale bundling chamber includes guide members arranged on the vertically bale-lifting platform to guide transverse movement of incoming bales inside the first and second enclosures until contacting with a side wall acting as a single reference contact surface for the bales. Similarly, the bale conveyor device is configured and arranged to convey one incoming bale at the entrance of the bale bundling chamber occupying one or both of the bale loading positions.

FIG. 10 corresponds to an alternative arrangement of guide members 12 inside the bundling chamber 2 suitable for the bale bundling machine 1 to form a single bale bundle inside both the first and second enclosures 2a, 2b. For this particular use of the machine, the arrangement of the first and second group of guide members 12a, 12b on the bale-lifting platform 13 is modified to guide transverse movement of one incoming bale until contacting with side wall 14 of the bundling chamber 2. Similarly, the retractable member 6 is kept inoperative, and also three binding units 25 of the second group 25b of binding units 25 and one binding unit 25 of the first group 25a of binding units 25a, 25b are left inoperative without yarn 22.

Figure 11:
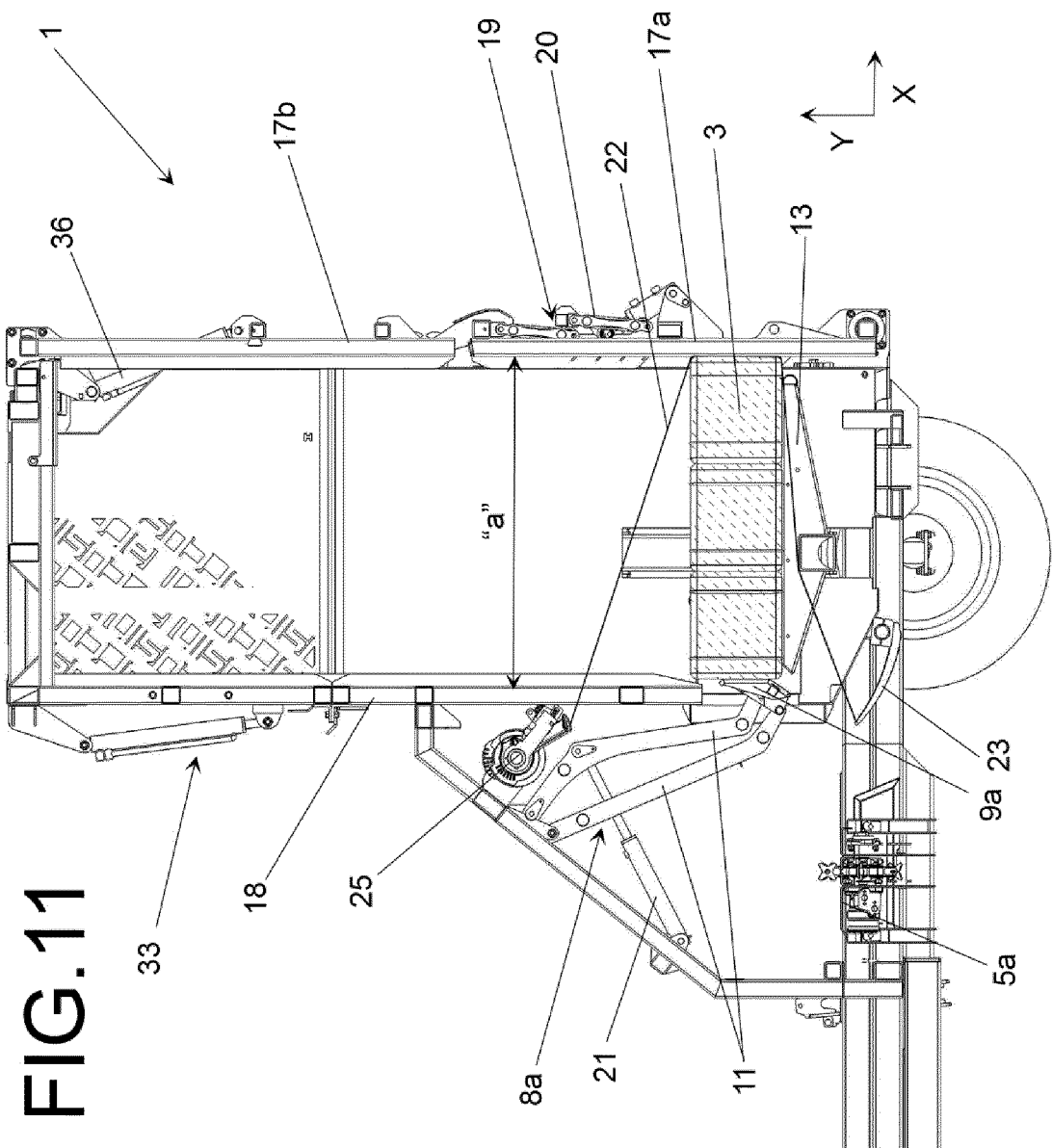
FIGS. 11 and 12 are schematic sections views of the bundling machine of FIG. 1 showing a working sequence of the bale pushing devices on respective bale layers formed inside the first and second enclosures of the bundling chamber. Each pushing device includes a pushing member with a compressing surface adapted to apply an active compression force in the transverse "X" and against a rear wall of the first and second enclosures while the lifting platform vertically displaces both layers of bales inside the bundling chamber.
Figure 12:
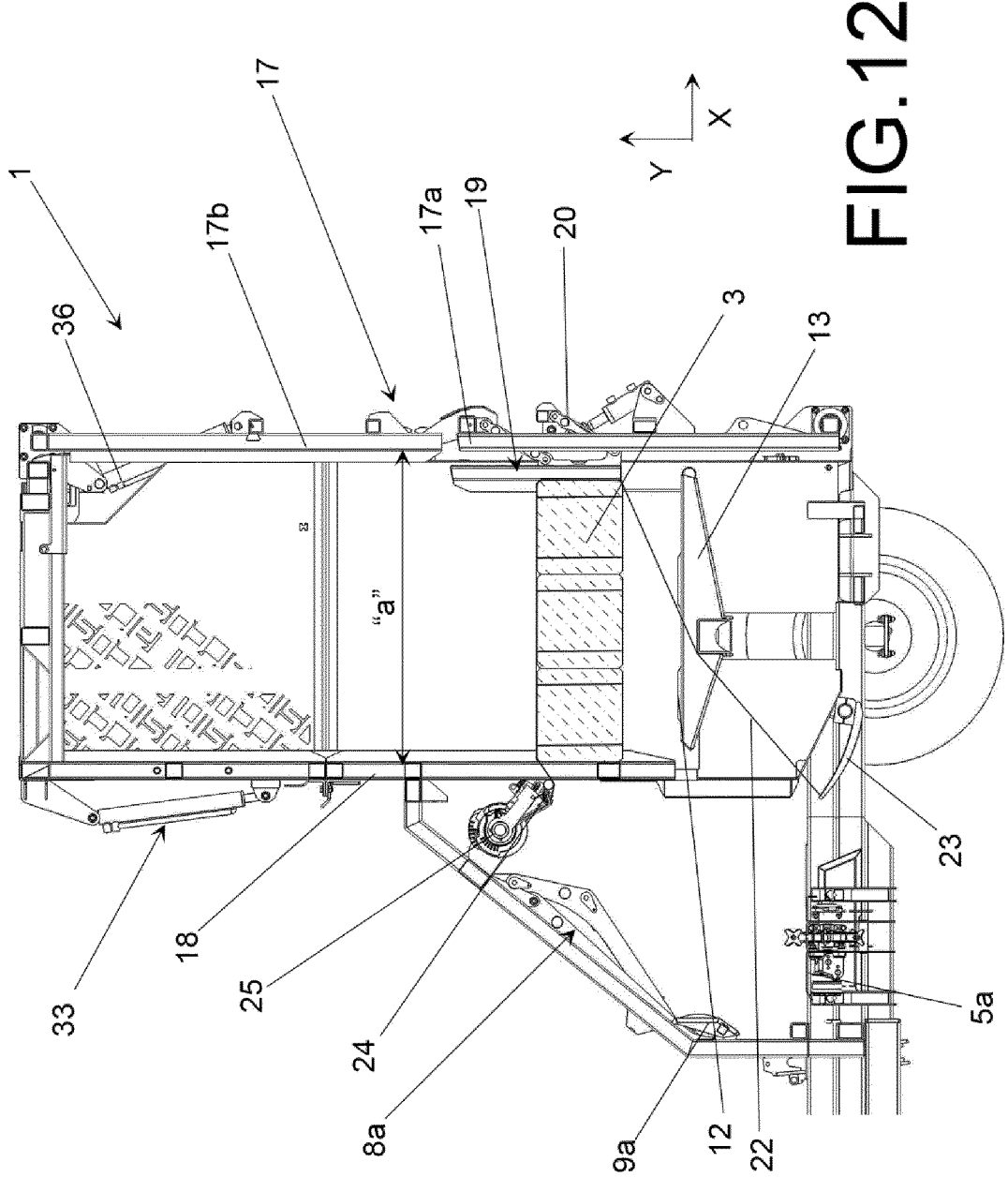

FIGS. 11 and 12 are schematic sections views of the embodiment of the bundling machine of FIG. 1 showing a working sequence of the bale pushing devices 8a, 8b on respective bale layers 3 formed inside the first and second enclosures 2a, 2b of the bundling chamber 2. As previously described, each bale pushing device 8a, 8b comprises a bale pushing plate 9a, 9b articulately attached to pivoting arms 11 of its respective parallelogram mechanism 10. The pushing plates 9a, 9b are actuated by a fluid-dynamic cylinder 21 that acts on the respective parallelogram mechanism 10, so that the respective pushing plates 9a, 9b can be displaced maintaining a substantially vertical position while oscillating from a retracted position to an advanced position without losing contact with the incoming bales 3B1, 3B2.

For the illustrated embodiment of FIGS. 1 to 16, the value resulting from the sum of the nominal width "A" of three bales forming a bale layer 3 exceeds a reduced width "a" of the bundling chamber 2. FIG. 11 represents the pushing plates 9a, 9b of both bale pushing devices 8a, 8b applying on the respective bale layers 3 an active compression force in a transverse "X" direction against a rear wall 17 of the first and second enclosures 2a, 2b of the bundling chamber 2 while the lifting platform 13 displaces the respective bale layers 3 vertically to an upper position.

In the upper position shown in FIG. 12, a front wall 18 and the rear wall 17 of the first and second enclosures 2a, 2b of the bundling chamber 2 exert a passive compression force on the bale layers 3, since the first and second enclosures 2a, 3b of the bundling chamber 2 have the mentioned reduced width "a". In particular, this FIG. 12 represents the bale layers 3 retained in the upper position by two retaining devices 19, while the bale-lifting platform 13 recovers its lower position awaiting new bale layers to be formed. For the illustrated embodiment, the retaining devices 19 are articulately attached to the rear wall 17 of the bundling chamber 2 via a parallelogram mechanism 20.

Figure 13:
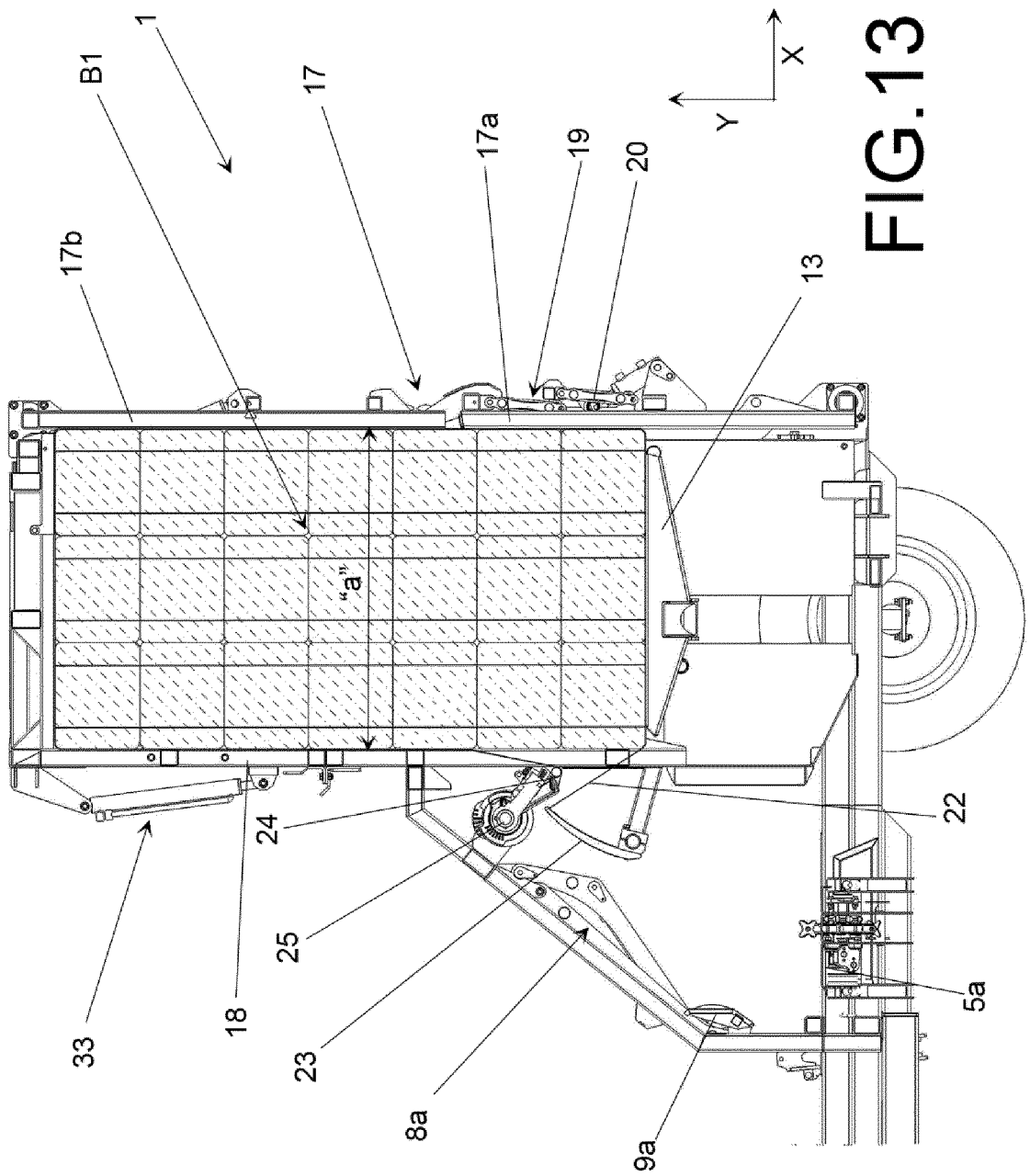
FIG. 13 is a schematic section view of the bundling machine of FIG. 1 showing the bale-lifting platform at the end of the loading cycle and applying an active compression force on the bale layers in the longitudinal direction "Y" to compress vertically the bundles inside the first and second enclosures. This figures also shows one of the needles that bind the yarn turns in a raised position about to carry out the binding operation of the bundles.
Figure 14:
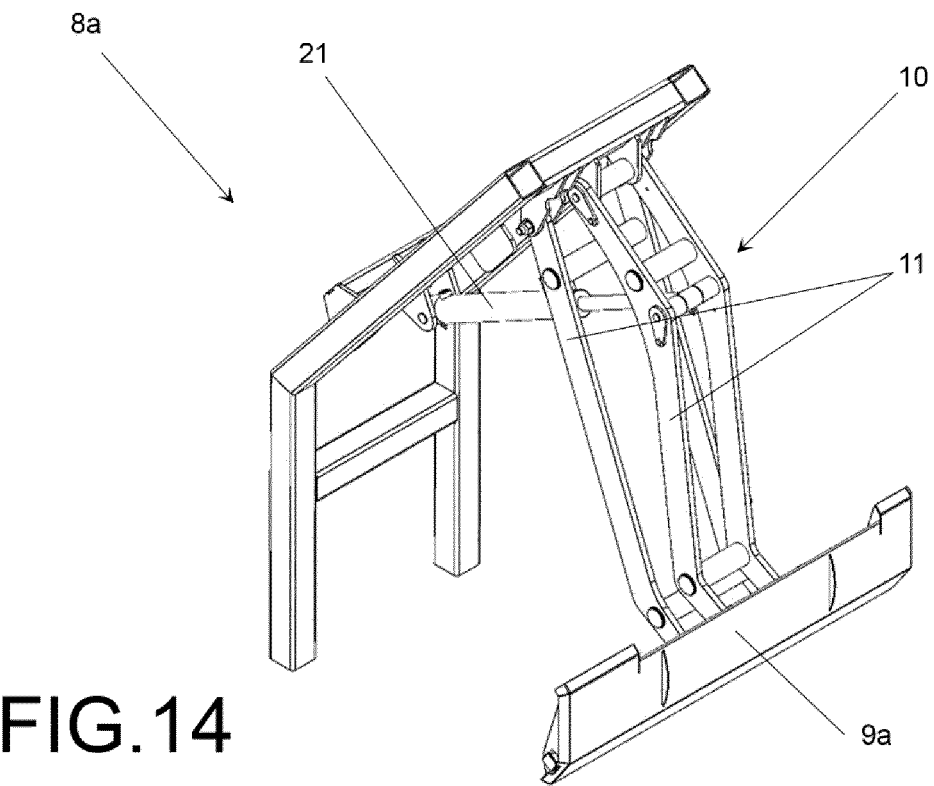
FIG. 14 is a perspective view of a pushing member of one of the pushing devices of the bale bundling machine of FIG. 1 responsible for inserting bales into one of the enclosures of the bundling chamber. The pushing member is configured by way of a plate that applies an active compression force on the bales in the transverse "X" direction and against the rear wall of the bundling chamber. This pushing plate is articulately attached to pivoting arms of a parallelogram mechanism hanging from a frame structure of the bundling machine.

The image of FIG. 13 shows the bale-lifting platform 13 at the end of a loading cycle of two bale bundles B1, B2 applying on the respective bale layers 3 an active compression force in the longitudinal direction "Y" to compress vertically the respective bale bundles B1, B2 inside the first and second enclosures 2a, 2b. This FIG. 15 also shows one of the complete turns of a yarn 22 that surrounds bale bundles B1, B2, and its corresponding needle 23 that holds the yarn 22. Also shown is an element 24 that acts as a pivot to guide the turns of yarn 22 from the outside of the bundling chamber 2, according to an upward trajectory inclined with respect to the surface of the bundles B1, B2. In this figure the needles 23 that hold the respective yarns 22 have been displaced to a higher position in order to form the binds that bind each bale bundle B1, B2. The inclined upward trajectory facilitates the tensioning of the yarn 22 so that it is tight to the bale bundles B1, B2, while reducing the length of yarn 22 necessary to carry out the binding operation on the bale bundles B1, B2.

As can be seen in the illustrated embodiment of FIGS. 1 to 16, the bale bundling system comprises a plurality of binding units 25 distributed aligned in correspondence with the bale entrance of the bundling chamber 2, wherein a first group 25a of said plurality of binding units 25 is arranged in correspondence with the first enclosure 2a and a second group 25b of said plurality of binding units 25 is arranged in correspondence with the second enclosure 2b (see, FIGS. 1 to 4). Each of the binding units 25 of the respective first and second groups 25a, 25b can provide a turn of yarn 22 on the respective first and second bale bundles B1, B2.

As previously disclosed, for the particular use of the machine wherein a single bale bundle is to be formed inside the bundling chamber 2, it may happen that at least one of the binding units 25 of the respective first 25a and second 25b groups, or all the binding units 25 of the second group 25b, are left inoperative without yarn 22.

According to a preferred embodiment, the claimed system includes an adjustment mechanism for adjusting the width "a" of the first and second enclosures 2a, 2b as a function of the nominal width "A" of the bales that form the bale bundles B1, B2. Thanks to this, the system is suitable for use with bales of different nominal "A" widths, for example, of nominal "A" width of 440 mm, 460 mm, 500 mm, or 560 mm. Thus, depending on the nominal width "A" of the bales, the user can adjust the width "a" of the bundling chamber 2 to cause the front wall 18 and the rear wall 17 of the bundling chamber 2 itself to apply a passive compression force on the layers 3 of bales in a transverse direction "X" of the bundles B1, B2.

For example, for the illustrated embodiment of FIGS. 1 to 16, the width "a" of the first and second enclosures 2a, 2b can be designed with a value of 1280 mm less than the value of 1380 mm resulting from the sum of the nominal width "A" of 460 mm of three bales that form a bale layer 3. In this way, the claimed system makes it possible to obtain two extremely compact bale bundles B1, B2, both in the transverse and longitudinal direction of the bundle, since the passive compression force applied by the front 18 and rear 17 walls of the bundling chamber limits the lateral expansion of the bale layers 3, when the lifting platform 13 longitudinally presses the bale layers at the end of the loading cycle. As a result, extremely compact first and second bale bundles B1, B2 can be formed simultaneously inside the bale bundle chamber 2 and both bale bundles B1, B2 can be unloaded on the ground also simultaneously.

For the illustrated embodiment of FIGS. 1 to 16, the rear wall 17 of the bundling chamber 2 comprises a rear wall portion 17a that acts as a lower unloading door for the first and second enclosures 2a, 2b, and a rear wall portion 17b that acts as an upper unloading door also for the first and second enclosures 2a, 2b. To expand or reduce the width "a" of the first and second enclosures 2a, 2b of the bundling chamber 2, the adjusting mechanism comprises both wall portions 17a, 17b pivotally mounted on respective skids 26, 27, which, in turn, are mounted displaceable on respective guides 28 and 29 on which both rear wall portions 17a, 17b are horizontally moved.

In order to ensure the closing position of both unloading doors and prevent these doors from being opened when the pushing plates 9a, 9b apply the active compression force on the respective bale layers 3, the claimed system includes fixing means that act by blocking the opening of both wall portions 17a, 17b acting as unloading doors.

In the embodiment described and shown in the FIGS. 1 to 16, the fixing means include at least one staple-like fastening member 30, a force multiplier mechanism (not shown) associated with said fastening member 30, and a fluid-dynamic element (not shown), e.g., a hydraulic cylinder, for actuating the multiplier mechanism. FIGS. 1 and 4 show the fixing means mounted on a side wall of the bundling chamber 2, wherein the fastening member 30 is in the closing and locking position, holding supports 31 integrally attached to the rear wall portions 17a, 17b acting as unloading doors for the first and second enclosures 2a, 2b. The fluid-dynamic element of the force multiplier mechanism has the peculiarity that it is mounted displaceable on the side wall of the bundling chamber 2 by means of a threaded rod mechanism 32, which allows adapting the position of the fixing means to the width "a" of the bundling chamber 2.

Figure 15:
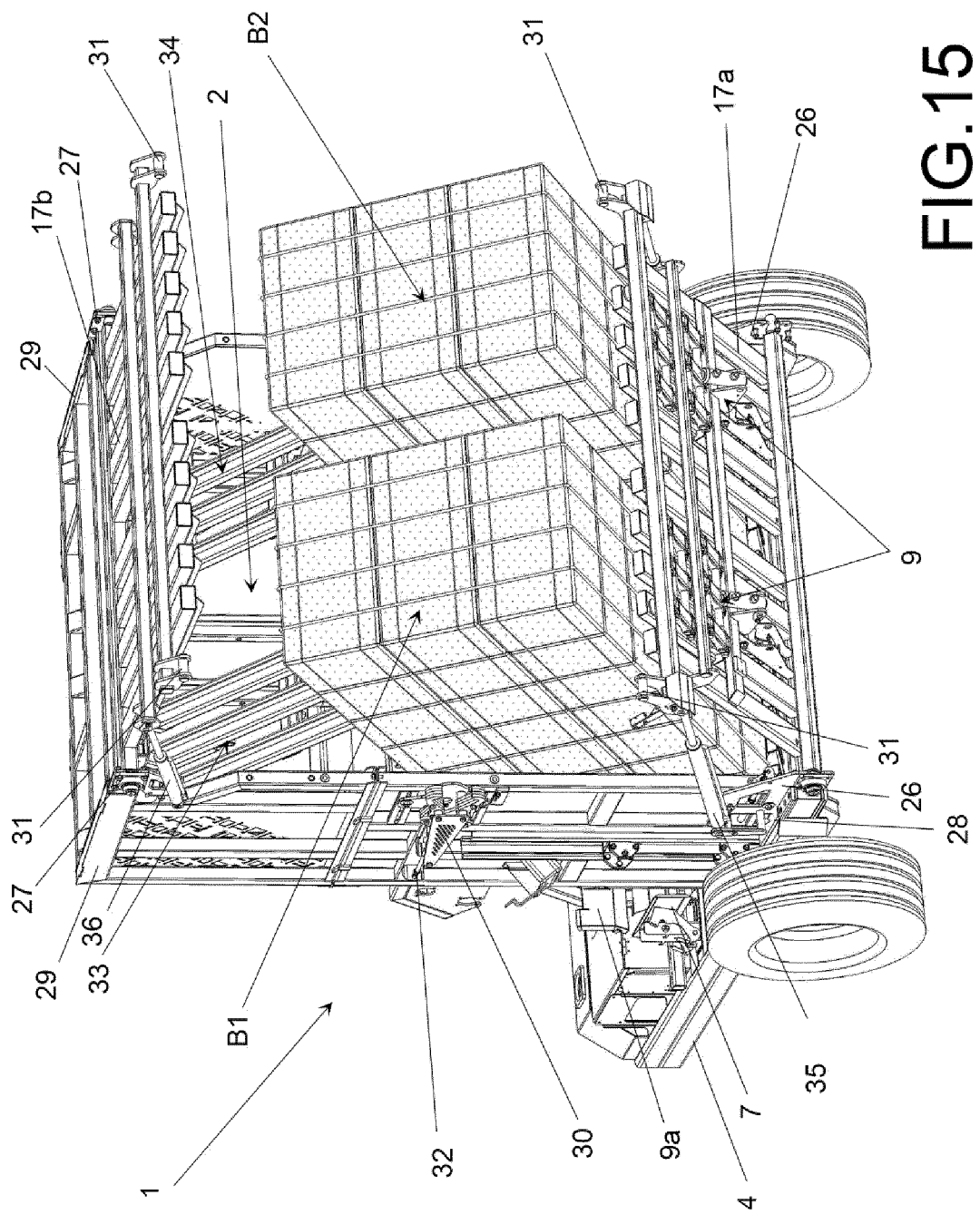
FIGS. 15 and 16 are schematic rear perspective views of the bundling machine of FIG. 1, showing the ejection operation of the first and second bundle of bales accompanied by the respective ejection devices and by the rear wall portion on which the bundles rest. This rear wall portion acts as lower door for the first and second enclosures of the bundling chamber. As can be seen in the figures, each ejector device comprises three ejector members that are associated with the front wall and upper wall of the bundling chamber so as to pivot with respect to these walls to accompany the extraction of the bundles.
Figure 16:
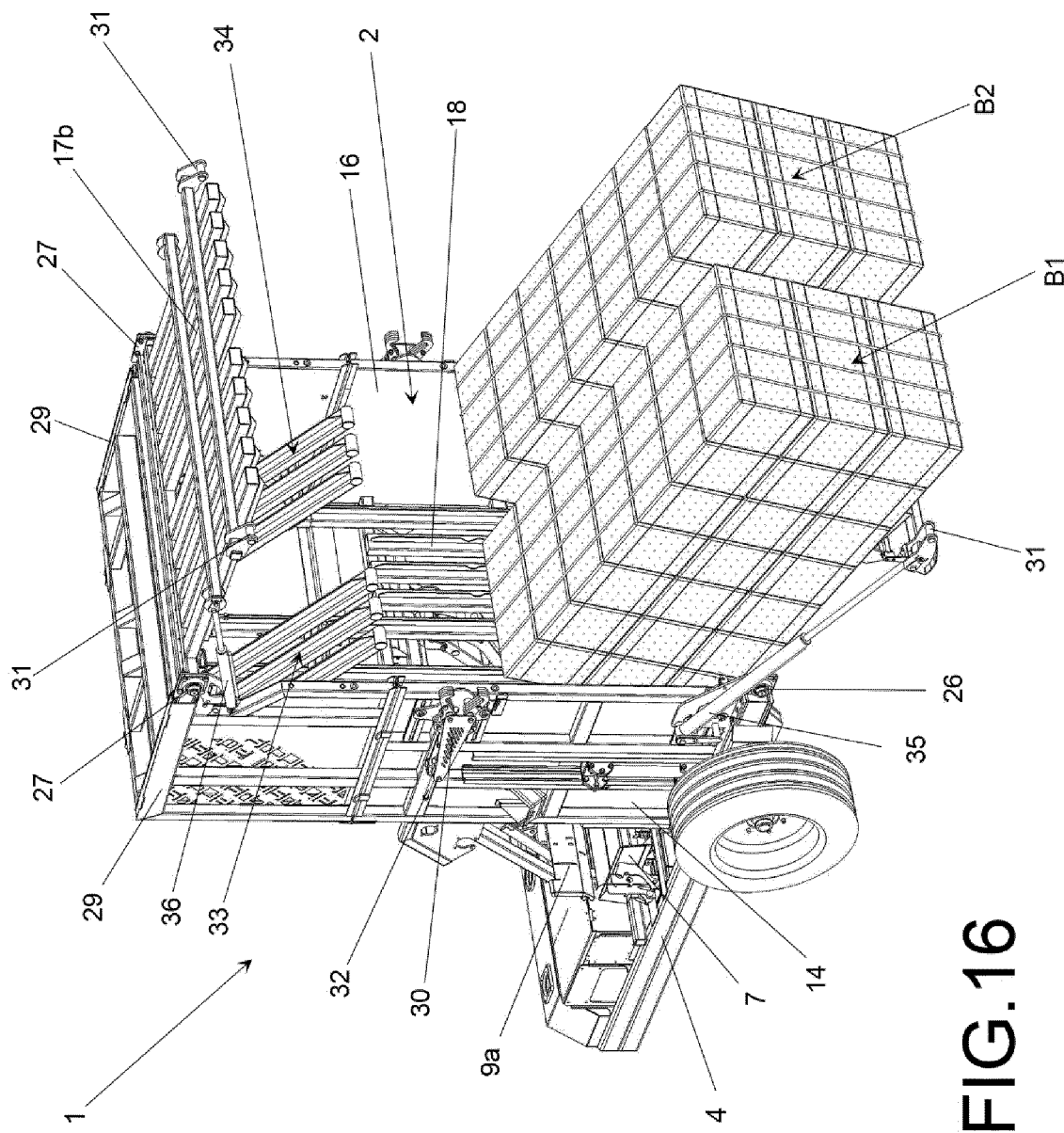

FIG. 15 is a rear perspective view of the bundling machine 1 of FIG. 1 showing the simultaneously ejection on edge of two formed bale bundles B1, B2 inside the first and second enclosures 2a, 2b of the bundling chamber 2. For the illustrated embodiment, the ejection operation is accompanied by two ejector devices 33, 34 each including three ejector members 33a, 34a. In this FIG. 17 the lower rear wall portion 17a acting as lower unloading door and the upper rear wall portion 17b acting as upper unloading door can be seen open, once the fastening member 30 of the doors has released the holding supports 31 to allow both rear wall portions 17a, 17b acting as unloading doors to pivot on the respective support skids 26, 27, actuated by respective fluid dynamic cylinders 35, 36. The ejector members 33a, 34a are associated with the front wall 18 and the upper wall of the bundling chamber 2 so that they pivot relative to these walls to accompany the simultaneously removal of the first and second bundles B1, B2 while the machine 1 is traveling through the field drawn by a tractor (see, FIG. 16).

As can be seen in FIG. 16, with the claimed system first and second bale bundles B1, B2 can be unloaded from the same bundling chamber 2 and exit the machine smoothly as it moves forward so that both first and second bale bundles B1, B2 rest paired on the ground of the field one next to the other ready for collection.

Next, the way of operation of the claimed bundling system is described with reference to FIGS. 1 to 16. In particular, it is described a method for forming a first bale bundle B1 and a second bale bundle B2 within a first enclosure 2a and a second enclosure 2b of a bundling chamber 2, wherein each of said first and second bale bundles B1, B2 comprises a plurality of bale layers 3 and each bale layer a plurality of bales, for example, two, three or more bales.

The method comprises the steps of;
a) conveying a first incoming bale 3B1 to a first bale loading position P1 and a second incoming bale 3B2 to a second bale loading position P2 located at a bale entrance of the bundling chamber 2,
b) displacing said first and second incoming bales 3B1, 3B2 from the first and second bale loading positions P1, P2 into the respective first and second enclosures 2a, 2b arranged inside the bundling chamber 2,
c) forming one of said plurality of bale layers 3 within the respective first and second enclosures 2a, 2b by successively displacing a number of incoming bales 3B1, 3B2 from the respective bale loading positions P1, P2 into the respective first and second enclosures 2a, 2b,
d) displacing the bale layer 3 formed within the respective first and second enclosures 2a, 2b to clear respective volume portions within the first and second enclosures 2a, 2b,
e) receiving a number of new incoming bales 3B1, 3B2 within the cleared volume portions of the respective first and second enclosures 2a, 2b to successively form new bale layers 3 within the respective first and second enclosures 2a, 2b,
f) forming the first and second bale bundles B1, B2 by successively displacing a number of said bale layers 3 formed within said respective first and second enclosures 2a, 2b, and,
g) simultaneously unloading said first and second bale bundles B1, B2 from the respective first and second enclosures 2a, 2b of the bundling chamber 2.

For a one embodiment, for example the illustrated embodiment shown in FIG. 1, both bale bundles B1, B2 are formed inside a vertically arranged bundling chamber 2 configured and arranged to respectively form said bale bundles B1, B2 disposed vertically in a longitudinal direction "Y". However, according to a different embodiment shown in FIGS. 17 to 24, both bale bundles B1', B2' may be formed inside a horizontally or tilted arranged first and second enclosures 2a', 2b' of a bundling chamber 2'.

According to the mentioned embodiment of FIGS. 1 to 16, the incoming bales 3B1, 3B2 are successively introduced into the first and second enclosures 2a, 2b by means of two pushing devices 8a, 8b including two pushing plates 9a, 9b that contact the incoming bales 3B1, 3B2, and successively displace them, one by one, into the first and second enclosures 2a, 2b. Guide members 12 guide transverse displacement of the incoming bales 3B1, 3B2 into the respective first and second enclosures 2a, 2b until contacting with respective predetermined reference contact surfaces 14, 15, 16.

Once the bale layers 3 are loaded inside the respective first and second enclosures 2a, 2b, the compressing surface of the respective pushing plates 9a, 9b applies an active compression force on bale layers 3 in the transverse "X" direction and against the rear wall 17 of the bundling chamber 2, while the lifting platform 13 simultaneously move the bale layers 3 vertically to an upper position inside the first and second enclosures 2a, 2b.

For the embodiment in which the width "a" of the first and second enclosures 2a, 2b is less than the value resulting from the sum of the nominal width "A" of the bales forming each bale layer 3, the front wall 18 and the rear wall 17 of the first and second enclosures 2a, 2b exert a passive compression force on the vegetal material, once the bale layers 3 have moved to the upper position. Two retaining devices 19 are then actuated to simultaneously retain bale layers 3 in the upper position and allow the lifting platform 13 to regain its initial position awaiting new bale layers 3 to be formed. This sequence is repeated successively to simultaneously load a certain number of bale layers 3 in the first and second enclosures 2a, 2b, until reaching the end of the loading cycle. At this moment, the lifting platform 13 travels again vertically inside the first and second enclosures 2a, 2b, to apply an active compression force on the bale layers 3 of each bundle B1, B2 in the longitudinal direction "Y", so that the vegetal material is compressed vertically.

The passive compression force exerted by the front wall 18 and the rear wall 17 of the first and second enclosures 2a, 2b limits the lateral expansion of the bale layers 3 when the lifting platform 13 vertically compresses both bundles B1, B2. As a result, extremely compact bale bundles B1, B2 are formed in a single bundling chamber 2. Both bale bundles B1, B2 are bound with yarn 22 by using respective binding units 25.

In order to unload the bale bundles B1, B2, the fastening member 30 which fastens the holding supports 31 of the lower rear wall portion 17a and the upper real wall portion 17b of the bundling chamber 2 is released to allow said rear wall portions 17a, 17b to pivot to carry out simultaneously unloading of both bale bundles B1, B2.

Figure 17:
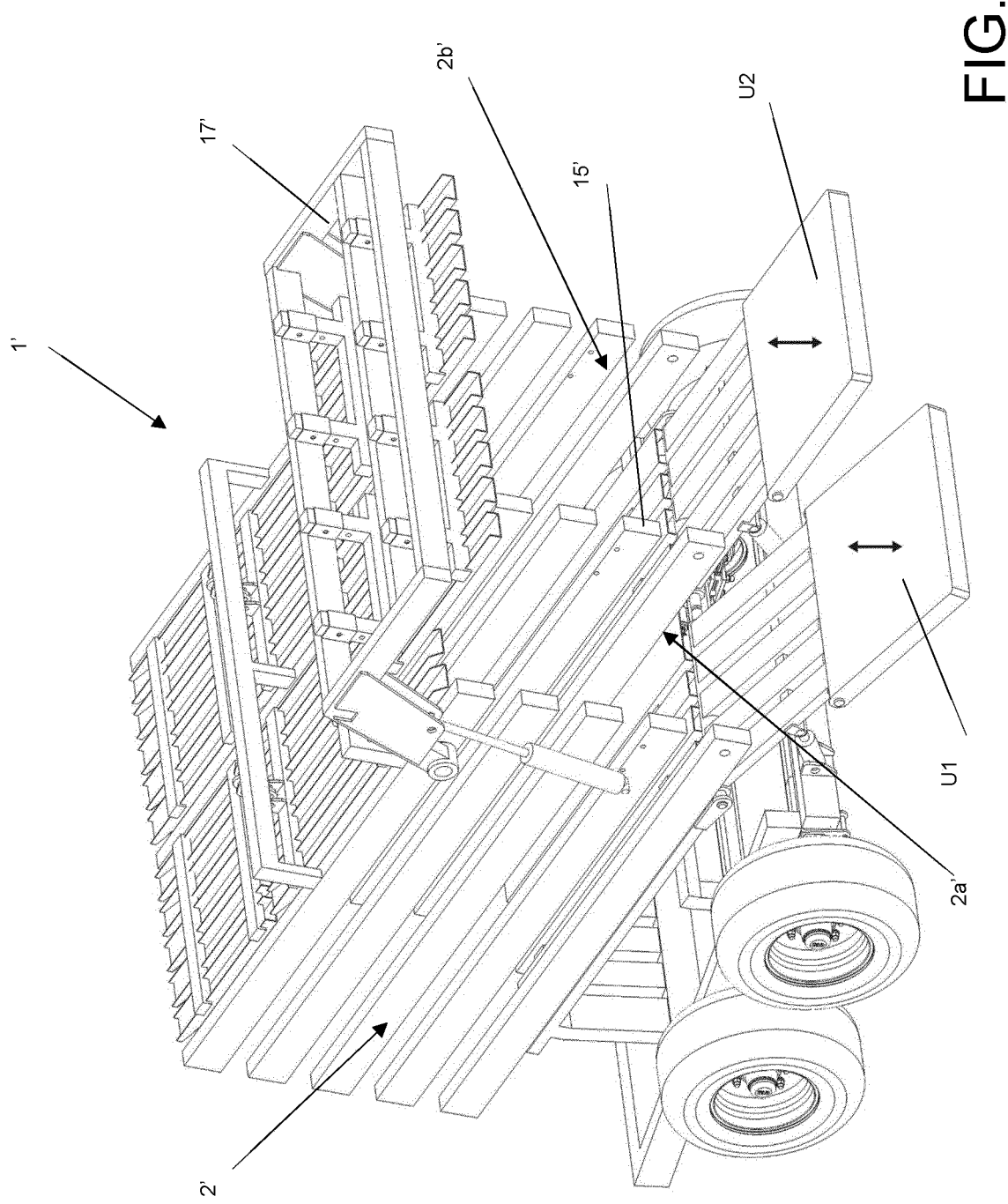
FIG. 17 is a schematic rear perspective view of an embodiment of the bundling machine for forming two bale bundles of hay or similar material disposed horizontally or tilted in a longitudinal direction "Y" of the bundles. The figure shows the rear wall of the bundling chamber open and both pivoting unloading rear platforms arranged at the rear of the bundling chamber.
Figure 18:
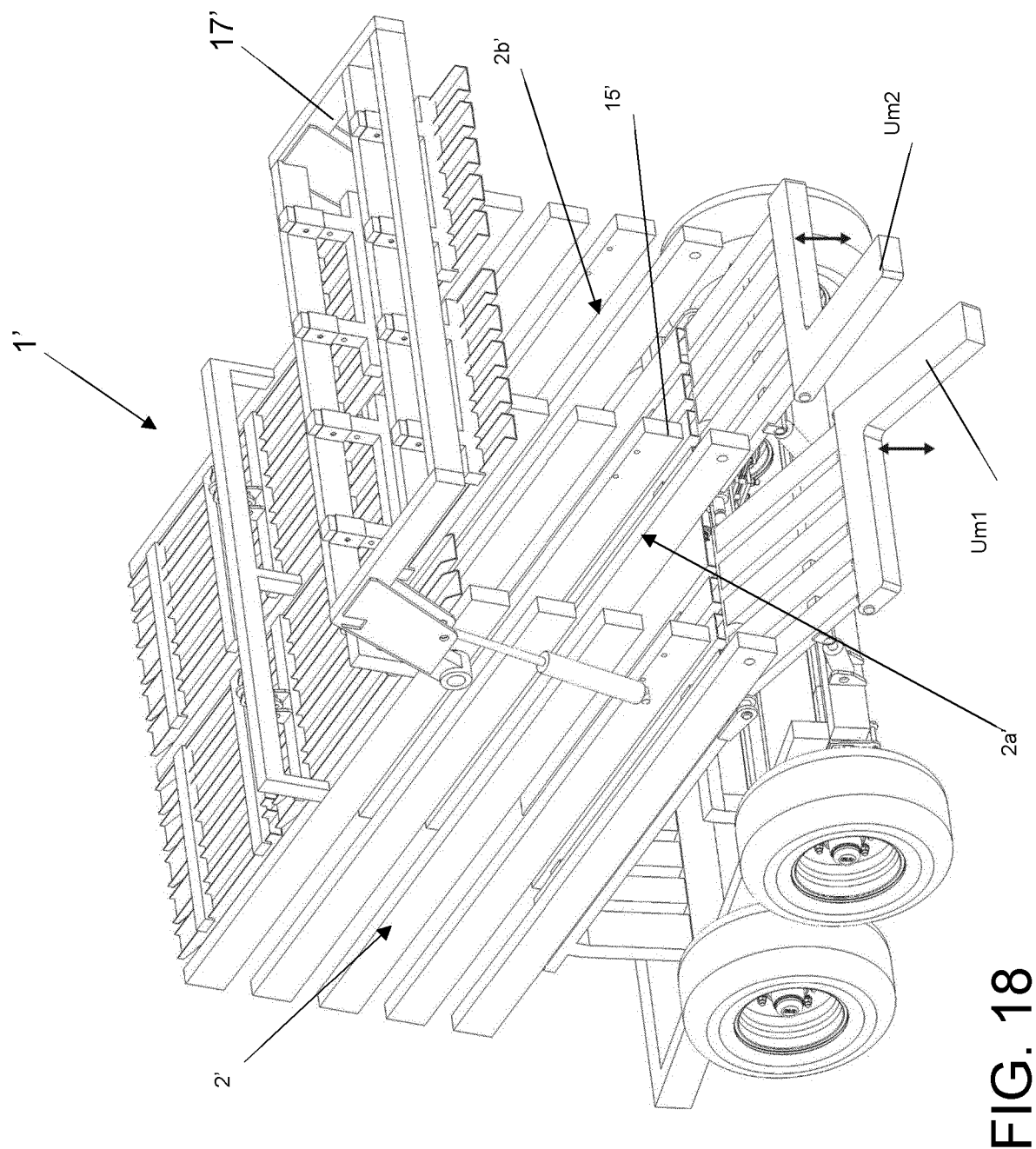
FIG. 18 is a schematic rear perspective view of the embodiment of the bundling machine for forming two bale bundles disposed horizontally or tilted in a longitudinal direction "Y" of the bundles, wherein the pivoting unloading rear platforms are configured and arranged to allow each of said first and second bale bundles to be unloaded on flat from the respective first and second enclosures of the bundling chamber.
Figure 19:
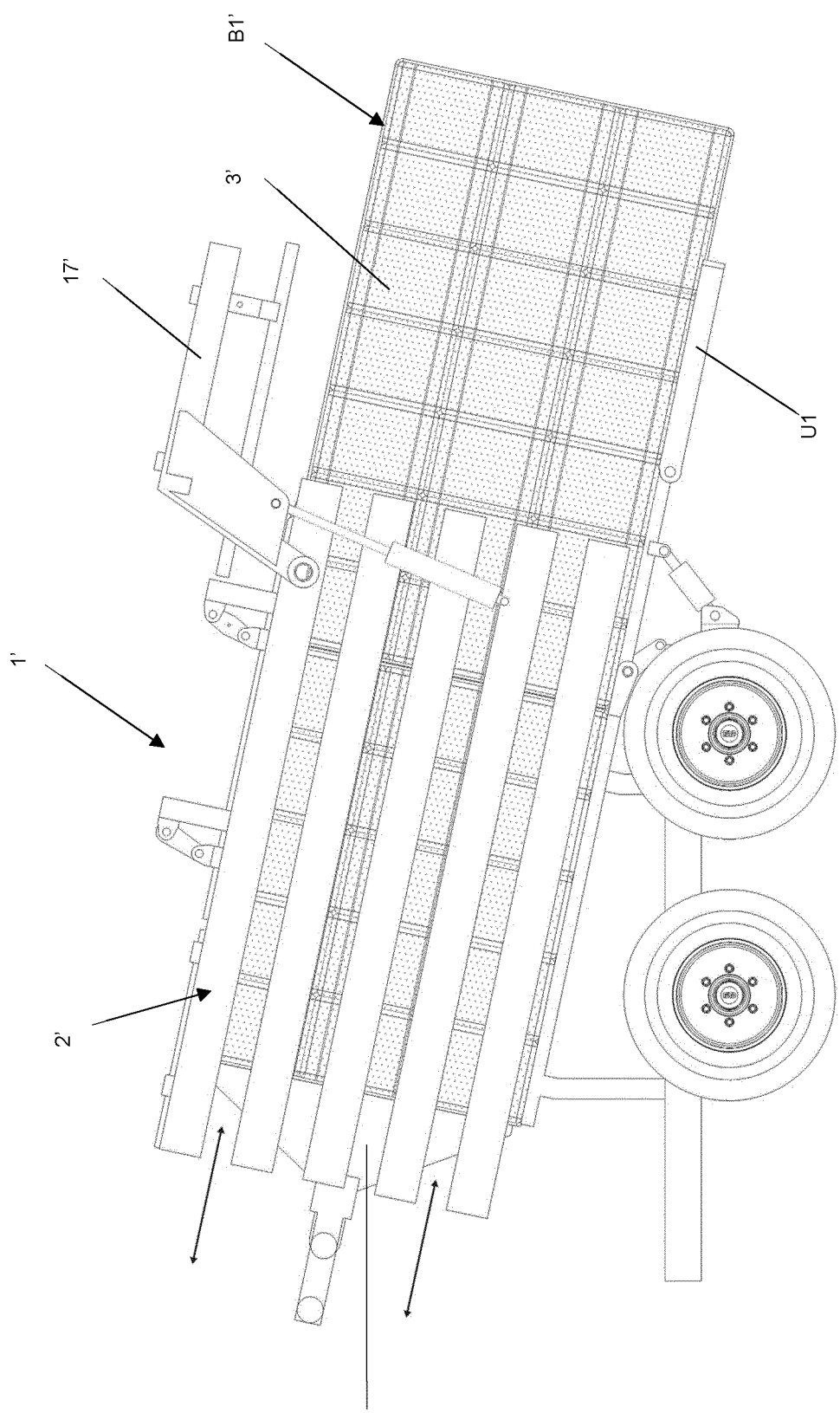
FIGS. 19 to 20 are schematic side views of the bundling machine of FIG. 17 showing the simultaneously unloading on edge of bale bundles by means of the pivoting unloading rear bale platforms.
Figure 20:
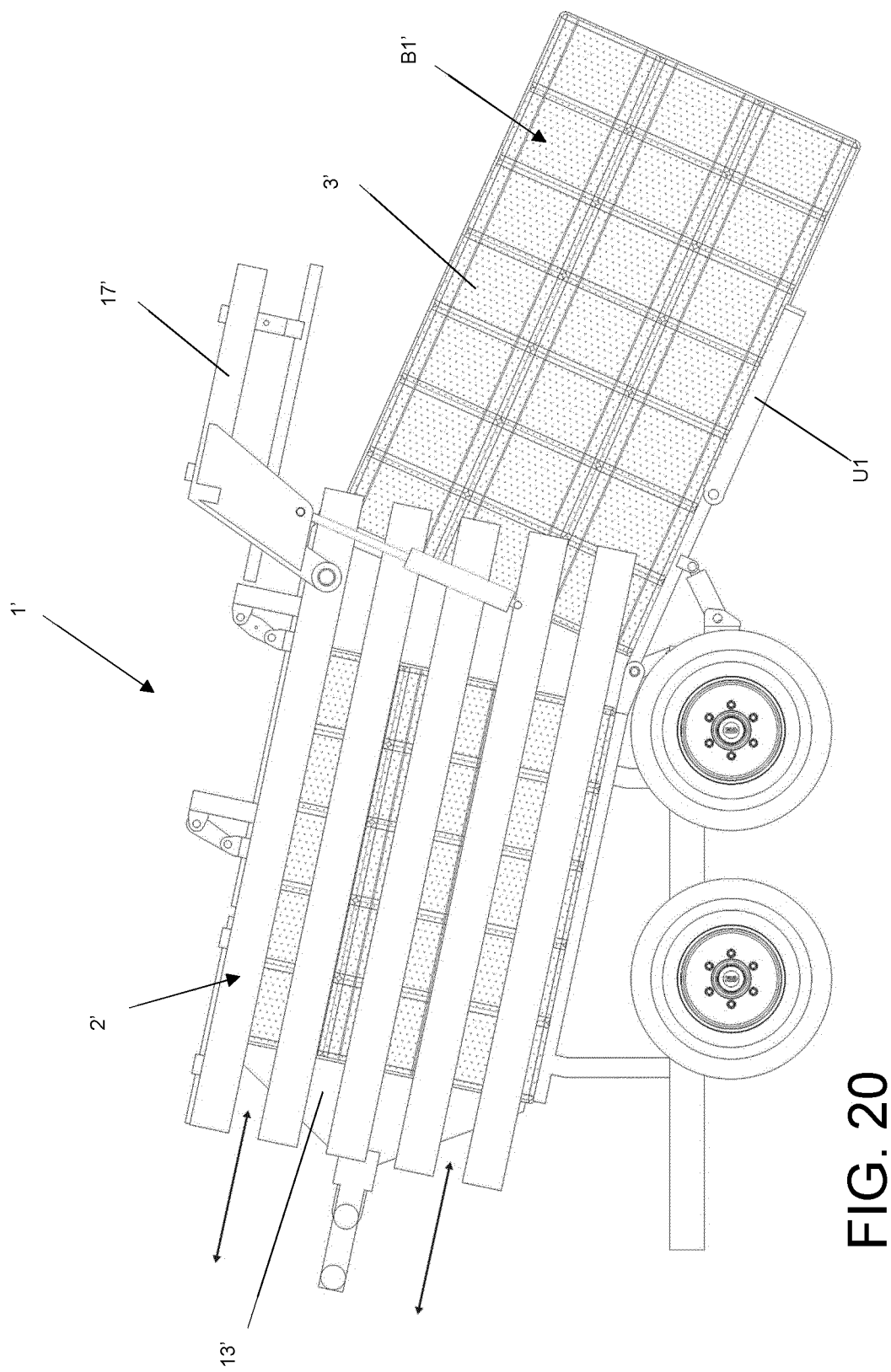

Referring now to FIGS. 17 and 18, these figures show schematic rear perspective views of an embodiment of the bundling machine 1' for forming two bale bundles B1', B2' of hay or similar material disposed horizontally or tilted in a longitudinal direction "Y" of the bundles.

As can be seen also in FIGS. 19 to 24, for this embodiment;
the first and second enclosures 2a', 2b' inside the bundling chamber 2' are configured and arranged to respectively form the first and second bales bundles B1', B2' disposed horizontally or tilted in a longitudinal direction "Y" of the bundles, and
the at least one bale pressing device includes at least one horizontally displaceable bale platform 13' mounted to displace bale layers 3' from a front position to a rear position within the respective first and second enclosures 2a', 2b' of the bundling chamber 2', and preferably, the bundling chamber 2' comprises a separating wall 15' arranged in between the first and second enclosures 2a', 2b'.

Additionally, the machine shown in FIGS. 17, 19, 20, 21 and 23 includes pivoting unloading rear platforms U1, U2 arranged at the rear of the bundling chamber 2' to allow simultaneously or sequentially unloading on edge of the bale bundles B1', B2'.

Figure 22:
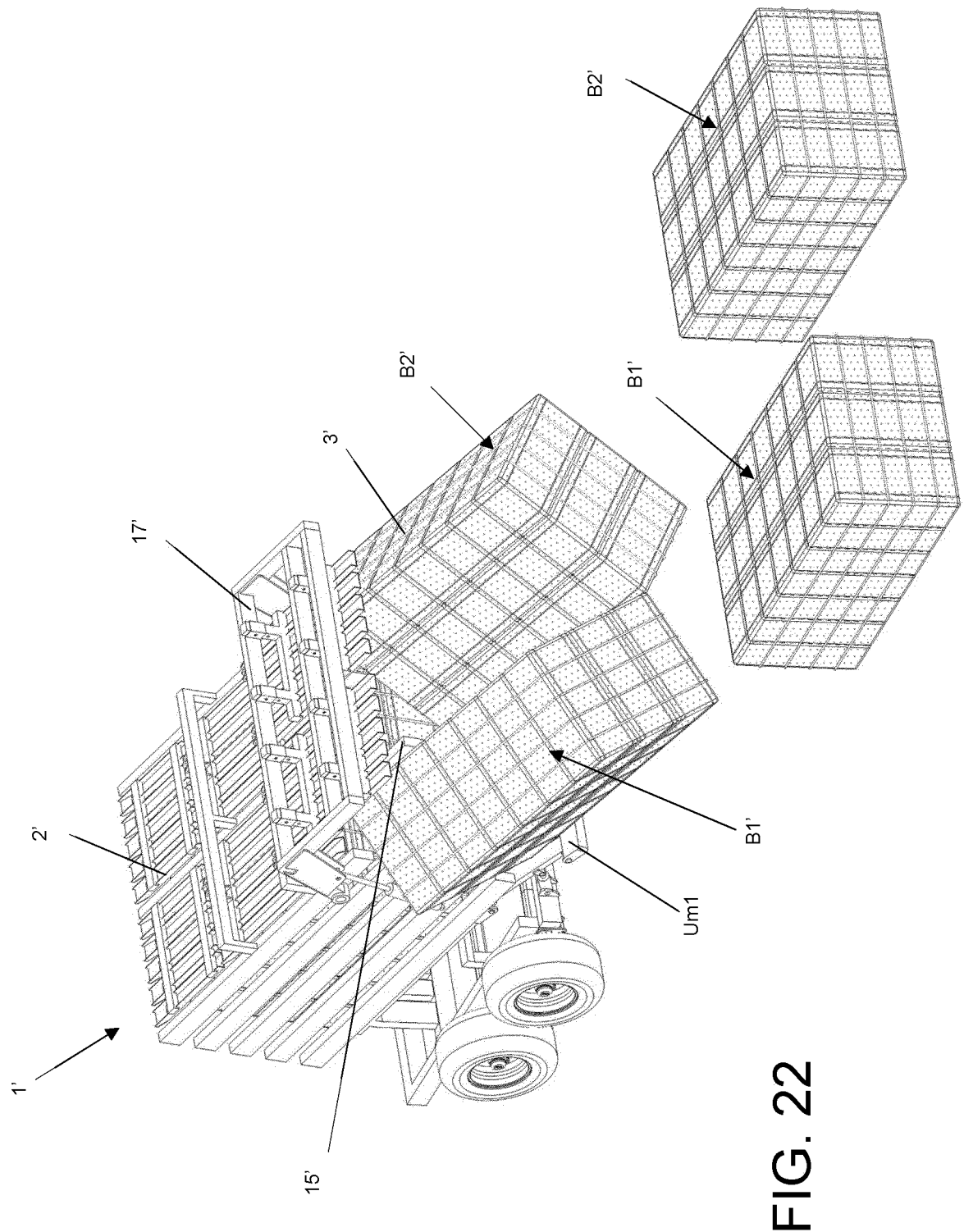
FIG. 22 is a schematic rear perspective view of the bundling machine of FIG. 18 showing the simultaneously unloading on flat of the first and second bale bundles by using the pivoting unloading rear platforms configured and arranged to allow each of said first and second bale bundles to be unloaded on flat from the respective first and second enclosures of the bundling chamber.
Figure 24:
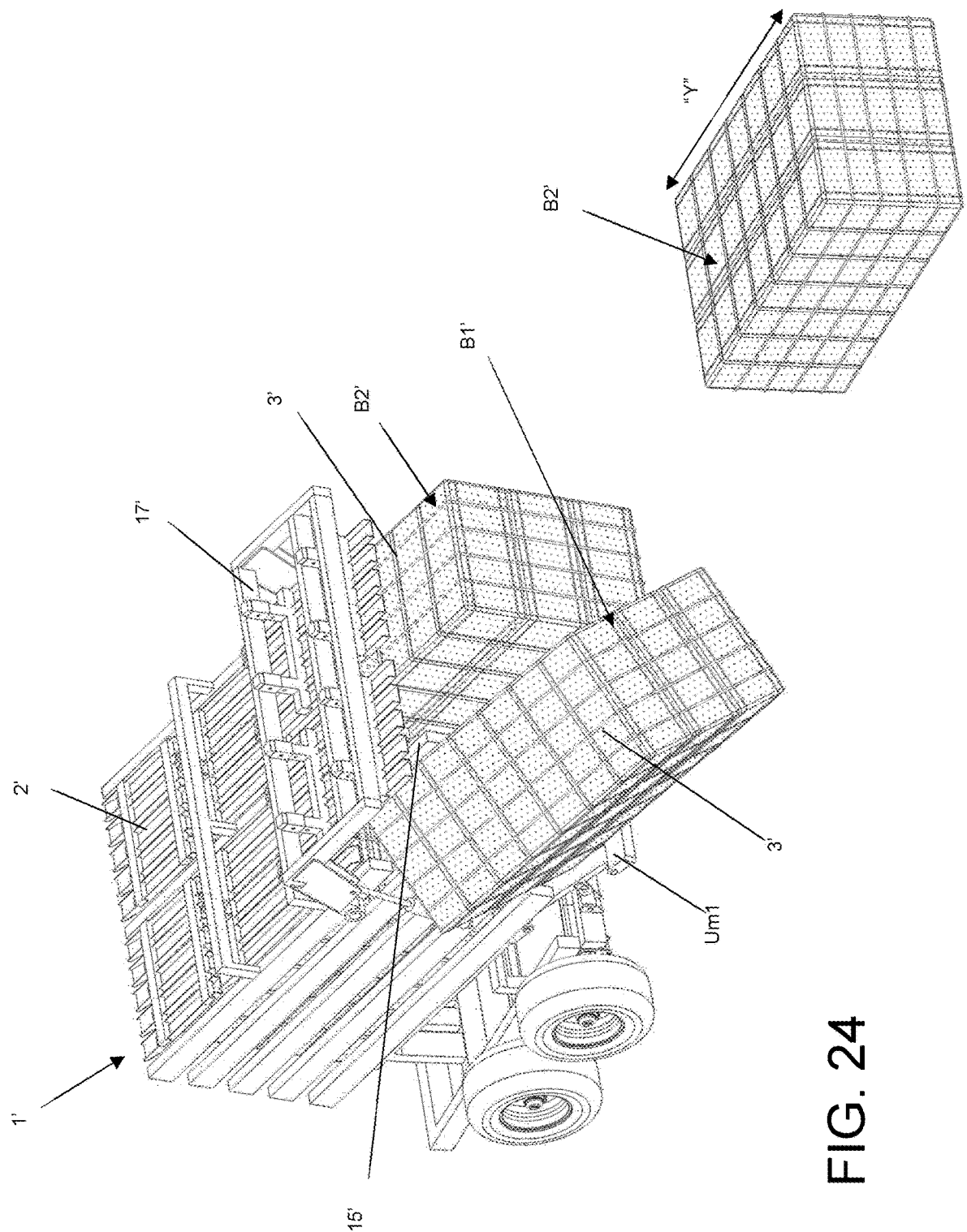
FIG. 24 a schematic rear perspective view of the bundling machine of FIG. 18 showing the sequentially unloading on flat of the first and second bale bundles by using the pivoting unloading rear platforms configured and arranged to allow each of said first and second bale bundles to be unloaded on flat from the respective first and second enclosures of the bundling chamber.

In contrast, the machine shown in FIGS. 18, 22 and 24 includes modified pivoting unloading rear platforms Um1, Um2 configured and arranged to allow each of said first and second bale bundles B1', B2' to be unloaded on flat from the respective first and second enclosures 2a', 2b' of the bundling chamber 2'. Said modified pivoting unloading rear platforms Um1, Um2 are configured to pivot each of said first and second bale bundles B1', B2' with respect its longitudinal axis "Y" during unloading.

Figure 21:
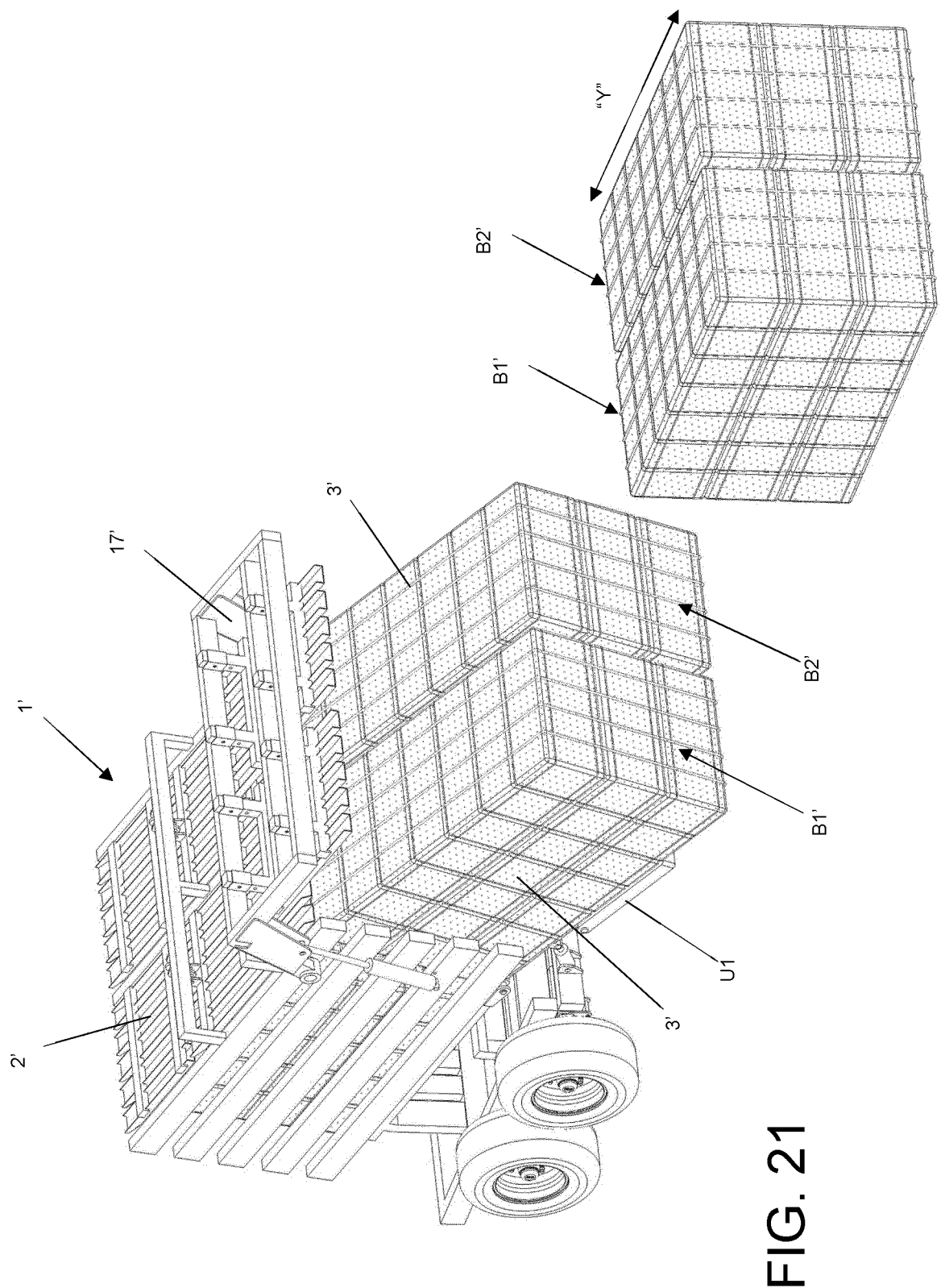
FIG. 21 is a schematic rear perspective view showing the simultaneously unloading on edge of the first and second bale bundles of FIGS. 19 and 20.
Figure 26:
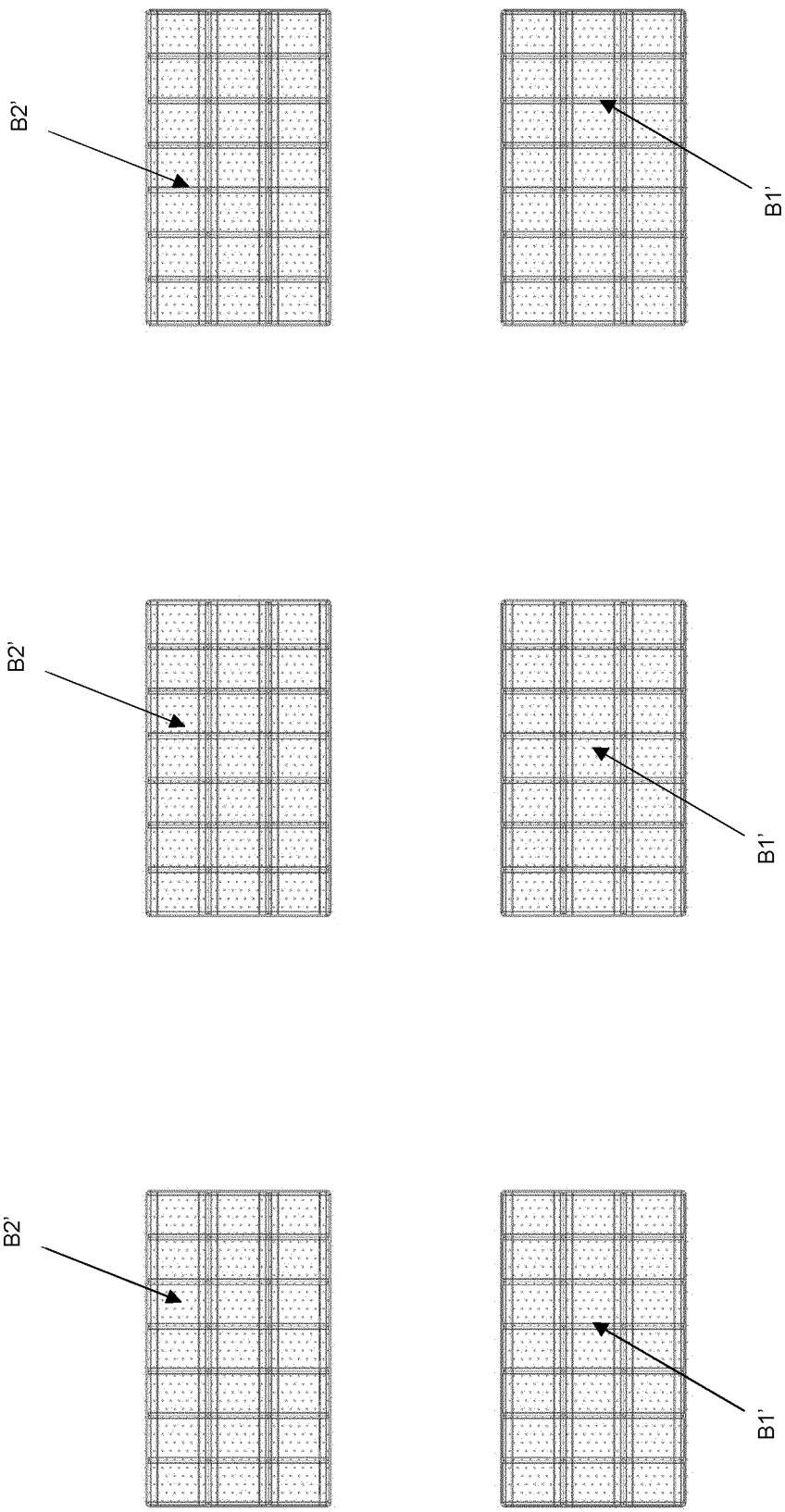
FIG. 26 shows first and second bale bundles unloaded from the bale bundling machine of FIG. 22 and arranged on flat and in pairs on the ground.

FIGS. 25 and 26 show first and second bale bundles B1', B2' unloaded on edge and on flat from the bale bundling machine 1' of FIGS. 21 and 22 and arranged in pairs on the ground.

Figure 23:
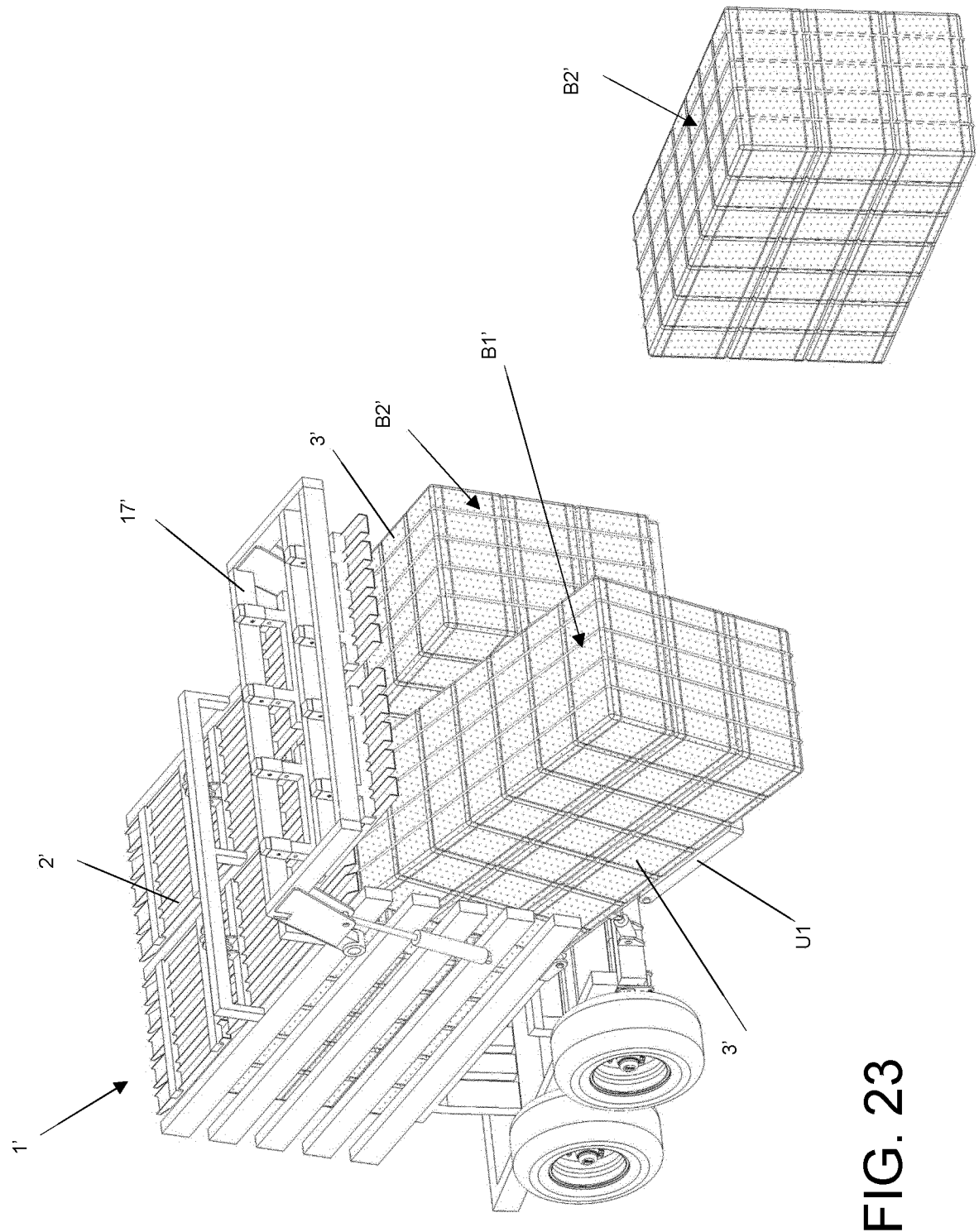
FIG. 23 is a schematic rear perspective view of the bundling machine of FIG. 17 showing the sequentially unloading on edge of the first and second bale bundles of FIGS. 19 and 20.

FIGS. 27 and 28 show first and second bale bundles B1', B2' unloaded on edge and on flat from the bale bundling machine1' of FIGS. 23 and 24 and arranged in a staggered pattern on the ground.

Summarizing, the claimed bundling system allows a plurality of bale bundles, in particular first and second bale bundles B1, B2 or B1', B2' to be formed inside a bundling chamber 2, 2' of a bale bundling machine 1, 1'. Both first and second bale bundles B1, B2 or B1', B2' can be unloaded from the same bundling chamber 2, 2' and exit the machine 1, 1' smoothly as it moves forward so that both first and second bale bundles rest paired or staggered on the ground of the field one next to the other ready for collection.

The claimed bundling machine 1, 1' is suitable to form first and second bale bundles B1, B1' and B2, B2' of bales of nominal length "L" comprised between 600 mm and 1000 mm, for example, bales of nominal length "L" comprised between 750 mm and 900 mm.

For a particular use, the same bundling machine 1 can easily modified to form a single bale bundle inside the first and second enclosures 2a, 2b, for example, a single bale bundle of bales of nominal length "L" comprised between 600 mm and 1500 mm (see, FIG. 10).

Although reference has been made to a specific embodiment of the invention, it is clear to a person skilled in the art that the system, machine, and method described are susceptible to numerous variations and modifications, and that all the details mentioned can be replaced by other technically equivalent ones, without departing from the scope of protection defined by the accompanying claims.

The invention claimed is:

1. A bale bundling system for a bale bundling machine of a type to be towed by a tractor or similar vehicle, comprising a bundling chamber and a bale conveying device to convey bales to a bale entrance of the bundling chamber,
wherein the bundling chamber includes
a first enclosure inside the bundling chamber made and arranged to be able to form a first bundle of bales inside the bundling chamber, wherein said first bale bundle comprises a plurality of layers of bales, and
a second enclosure inside the bundling chamber made and arranged to be able to form a second bundle of bales inside the bundling chamber, wherein said second bundle of bales comprises a plurality of layers of bales,
wherein said bale conveying device is arranged to convey a first incoming bale to a first bale loading position and a second incoming bale to a second bale loading position,
the system further comprising:
at least one bale pushing device arranged to displace said first and second incoming bales from the first and second bale loading positions into the respective first and second enclosures,
a processing and control unit configured to successively send a control signal to said at least one bale pushing device for said bale pushing device to successively displace a number of new incoming bales from the respective bale loading positions into the respective first and second enclosures to form one of said plurality of bale layers within the respective first and second enclosures,
at least one bale pressing device arranged to displace said bale layer formed within the first and second enclosures to clear respective volume portions within the first and second enclosures for said volume portions to be able to receive a number of new incoming bales to form new respective bale layers within the respective first and second enclosures,
wherein said processing and control unit is further configured to send a control signal to said at least bale pressing device for said bale pressing device to successively displace a number of new formed bale layers within the respective first and second enclosures to be able to form said first and second bale bundles within the bundling chamber.

2. The bale bundling system according to claim 1, wherein said first and second bale loading positions are arranged in series at the bale entrance of the bundling chamber.

3. The bale bundling system according to claim 1, wherein the bale conveying device comprises:
one bale conveyor unit arranged to convey the first incoming bale to the first bale loading position and the second incoming bale to the second bale loading position; and
a bale detection unit to detect presence of the second incoming bale at the second bale loading position,
wherein the processing and control unit is configured to send a stop signal to the at least one bale conveyor unit to stop actuation of said bale conveyor unit upon receiving a signal coming from the said bale detection unit.

4. The bale bundling system according to claim 1, wherein the bale conveying device comprises:
a first conveyor unit and a second bale conveyor unit arranged to respectively convey the first incoming bale to the first bale loading position and the second incoming bale to the second bale loading position;
a first bale detection unit to detect presence of the first incoming bale at the first bale loading position, wherein the processing and control unit is configured to send a stop signal to the first bale conveyor unit to stop actuation of the first bale conveyor unit upon receiving a signal coming from the said first bale detection unit; and
a second bale detection unit to detect presence of the second incoming bale at the second bale loading position, wherein the processing and control unit is configured to send a stop signal to the second bale conveyor unit to stop actuation of the second bale conveyor unit upon receiving a signal coming from the said second bale detection unit.

5. The bale bundling system according to claim 4, wherein said second bale detection unit to detect presence of the second incoming bale comprises a retractable member mounted to oscillate from an initial resting position to a working position in between the said first and second bale loading positions, wherein said second incoming bale is able to contact a surface of said retractable member at the second bale loading position when said retractable member is in its working position.

6. The bale bundling system according to claim 1, wherein:
said first and second enclosures inside the bundling chamber are made and arranged to respectively form said first and second bales bundles disposed horizontally or tilted in a longitudinal direction of the bundles; and
said at least one bale pressing device includes at least one horizontally displaceable bale platform mounted to displace bale layers from a front position to a rear position within the respective first and second enclosures of the bundling chamber.

7. The bale bundling system according to claim 1, wherein:
said first and second enclosures inside the bundling chamber are made and arranged to respectively form said first and second bales bundles disposed vertically in a longitudinal direction of the bundles; and
said at least one bale pressing device includes at least one vertically displaceable bale-lifting platform mounted to displace bale layers from a lower initial position to an upper position within the respective first and second enclosures of the bundling chamber,
wherein the system further comprises a bale retaining device for retaining in the upper position respective bale layers formed within the first and second enclosures when the bale-lifting platform recovers its initial lower position.

8. The bale bundling system according to claim 7, wherein the first and second enclosures of the bundling chamber comprise respective guide members arranged to guide displacement of the first and second incoming bales towards respective reference contact surfaces inside the first and second enclosures upon operation of said at least one pushing device, and wherein said guide members are arranged on said at least one vertically bale-lifting platform to guide transverse movement of the incoming bales within the respective first and second enclosures until contacting with respective reference contact surfaces.

9. The bale bundling system according to claim 8, wherein the bale-lifting platform comprises a separating wall arranged between the first and second enclosures, and wherein at least a first group of said guide members is arranged on the bale-lifting platform to guide transverse movement of at least one of said incoming bales within the respective first and second enclosures until contacting with said separating wall, said separating wall acting as a reference contact surface for at least one of the incoming bales inside the first and/or second enclosures.

10. The bale bundling system according to claim 7, wherein said guide members are mounted pivotable about a substantially vertical axis on the bale-lifting platform for the user to be able to modify the transverse direction of movement of the incoming bales within the respective first and second enclosures.

11. The bale bundling system according to claim 8, wherein said guide members are arranged on the bale-lifting platform to guide transverse movement of the incoming bales within the respective first and second enclosures until contacting with respective side walls of the bundling chamber, said side walls acting as said respective reference contact surfaces inside the first and second enclosures.

12. The bale bundling system as claimed in claim 7, wherein the bundling chamber comprises at least a rear wall arranged to act as a bale bundle unloading door for the first and second enclosures, and
wherein said at least rear wall of the bundling chamber comprises at least a rear wall portion arranged to act as a lower unloading door for the first and second enclosures, wherein said at least rear wall portion is mounted to pivot clockwise to unload respectively and simultaneously the first and second bale bundles from the first and second enclosures.

13. The bale bundling system according to claim 12, wherein the interior space of the first and second enclosures of the bundling chamber comprises a width in a transverse direction of the bale bundle that is equal to or less than the value resulting from the sum of a nominal width of the bales forming a bale layer inside the first and second enclosures.

14. The bale bundling system according to claim 1, wherein the first and second enclosures of the bundling chamber comprise respective guide members arranged to guide displacement of the first and second incoming bales towards respective reference contact surfaces inside the first and second enclosures upon operation of said at least one pushing device.

15. The bale bundling system according to claim 1, the system comprising:
a plurality of binding units distributed aligned in correspondence with the bale entrance of the bundling chamber,
wherein a first group of said plurality of binding units is arranged in correspondence with the first enclosure and a second group of said plurality of binding units is arranged in correspondence with the second enclosure, and wherein each of the binding units of the respective first and second groups is able to provide a turn of yarn on the respective first and second bale bundles.

16. The bale bundling system according to claim 1, wherein:
said first and second enclosures inside the bundling chamber are made and arranged to respectively form said first and second bales bundles disposed vertically in a longitudinal direction of the bundles;
said at least one bale pressing device includes at least one vertically displaceable bale-lifting platform mounted to displace bale layers from a lower initial position to an upper position within the respective first and second enclosures of the bundling chamber;
the system further comprises a bale retaining device for retaining in the upper position respective bale layers formed within the first and second enclosures when the bale-lifting platform recovers its initial lower position; and
the at least one bale pushing device comprises at least one pushing member arranged to introduce the incoming bales from its respective bale loading positions into the respective first and second enclosures of the bundling chamber, and wherein said at least one pushing member comprises a compressing surface adapted to provide an active compressing force on respective formed bale layers inside the first and second enclosures, said processing and control unit being configured to send a compaction signal to said bale pushing device for said compressing surface to apply the active compression force on the respective formed bale layers while the bale- lifting platform vertically displaces the respective bale layers inside the first and second enclosures.

17. The bale bundling system according to claim 1, wherein the bundling chamber comprises at least a rear wall arranged to act as a bale bundle unloading door for the first and second enclosures.

18. The bale bundling system according to claim 17, comprising an adjustment mechanism for modifying the width of the first and second enclosures based on the nominal width of the bales forming the bale layers of the first and second enclosures inside the bundling chamber.

19. The bundling system as claimed in claim 18, wherein said adjusting mechanism comprises at least one rear wall of the bundling chamber displaceable mounted on at least one pair of guides to be able to adjust the width of the interior space of the first and second enclosures inside the bundling chamber as a function of the nominal width of the bales forming a bale layer inside the first and second enclosures.

20. The bundling system as claimed in claim 1, comprising at least one ejector device for ejecting the first and second bale bundles from the bundling chamber, said at least one ejector device including at least one ejector member arranged in correspondence with the first enclosure and at least one ejector member arranged in correspondence with the second enclosure.

21. The bundling system as claimed in claim 1, wherein the bundling chamber comprises a rear wall and a first and a second pivotable unloading rear platforms associated to the rear wall, wherein said pivotable unloading rear platforms are made and arranged to allow said first and second bale bundles to be unloaded simultaneously or sequentially from the respective first and second enclosures.

22. A method for forming a first bale bundle and a second bale bundle within a bundling chamber of a bale bundling machine to be towed by a tractor or similar vehicle, wherein each of said first and second bale bundles comprises a plurality of bale layers, wherein the method comprises the steps of:

(a) conveying a first incoming bale to a first bale loading position and a second incoming bale to a second bale loading position located at a bale entrance of the bundling chamber;
(b) displacing said first and second incoming bales from the first and second bale loading positions into respective first and second enclosures arranged inside the bundling chamber;
(c) forming one bale layer of said plurality of bale layers within the respective first and second enclosures by successively displacing a number of incoming bales from the respective bale loading positions into the respective first and second enclosures;
(d) displacing a bale layer formed within the respective first and second enclosures to clear respective volume portions within the first and second enclosures;
(e) receiving a number of new incoming bales within the cleared volume portions of the first and second enclosures to successively form new respective bale layers within the respective first and second enclosures;
(f) forming the first and second bale bundles by successively displacing a number of said bale layers formed within said respective first and second enclosures; and
(g) simultaneously or sequentially unloading said first and second bale bundles from the respective first and second enclosures of the bundling chamber.

23. The method according to claim 22, wherein said first and second enclosures inside the bundling chamber are configured and arranged to respectively form said first and second bales bundles disposed horizontally or tilted in a longitudinal direction of the bundles, wherein step (g) comprises simultaneously or sequentially unloading said first and second bale bundles from the respective first and second enclosures of the bundling chamber by means of respective first and second pivotable unloading rear platforms.

24. The method according to claim 23, wherein step (g) comprises pivoting each of said first and second bale bundles with respect its longitudinal axis during unloading by means of modified respective pivotable unloading rear platforms configured and arranged to allow each of said first and second bale bundles to be unloaded on flat from the respective first and second enclosures of the bundling chamber.

* * * * *